US011143535B2

(12) United States Patent
Uenodan et al.

(10) Patent No.: US 11,143,535 B2
(45) Date of Patent: Oct. 12, 2021

(54) THERMAL-TYPE FLOWMETER

(71) Applicant: Hitachi Automotive Systems, Ltd., Hitachinaka (JP)

(72) Inventors: Akira Uenodan, Hitachinaka (JP); Takayuki Yogo, Hitachinaka (JP); Tsubasa Watanabe, Tokyo (JP); Takahiro Miki, Hitachinaka (JP); Shinobu Tashiro, Hitachinaka (JP); Hiroaki Hoshika, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 0 days.

(21) Appl. No.: 16/637,654

(22) PCT Filed: Jul. 17, 2018

(86) PCT No.: PCT/JP2018/026641
§ 371 (c)(1),
(2) Date: Feb. 7, 2020

(87) PCT Pub. No.: WO2019/049513
PCT Pub. Date: Mar. 14, 2019

(65) Prior Publication Data
US 2021/0148743 A1    May 20, 2021

(30) Foreign Application Priority Data

Sep. 5, 2017 (JP) .............................. JP2017-170243

(51) Int. Cl.
*G01F 1/696* (2006.01)
*G01F 1/684* (2006.01)
*G01F 5/00* (2006.01)

(52) U.S. Cl.
CPC .............. *G01F 1/696* (2013.01); *G01F 1/684* (2013.01); *G01F 5/00* (2013.01)

(58) Field of Classification Search
CPC ............ G01F 1/696; G01F 1/684; G01F 5/00
See application file for complete search history.

(56) References Cited

U.S. PATENT DOCUMENTS

2005/0150290 A1    7/2005    Kawai et al.
2013/0061684 A1    3/2013    Frauenholz et al.
(Continued)

FOREIGN PATENT DOCUMENTS

DE    10 2010 020 264 A1    12/2011
JP        2001-153706 A      6/2001
(Continued)

OTHER PUBLICATIONS

International Search Report (PCT/ISA/210) issued in PCT Application No. PCT/JP2018/026641 dated Nov. 6, 2018 (two pages).
(Continued)

*Primary Examiner* — Francis C Gray
(74) *Attorney, Agent, or Firm* — Crowell & Moring LLP

(57) ABSTRACT

Provided is a thermal-type flowmeter which can prevent a reduction of flow rate accuracy and reliability, and an increase of cost of the thermal-type flowmeter compared to the related art, and can add a function of an electrostatic scattering mechanism. The thermal-type flowmeter of the present invention includes a sub-passage into which part of a measurement target gas flowing in a main passage is taken, a flow rate detection element of a flow measurement unit which is disposed in the sub-passage, a circuit package which supports the flow rate detection element, and a substrate to which the circuit package is fixed. The flow rate detection element includes a detection surface to detect a flow rate of the measurement target gas. The detection surface is disposed to face the circuit substrate.

15 Claims, 26 Drawing Sheets

(56) References Cited

U.S. PATENT DOCUMENTS

| | | | | |
|---|---|---|---|---|
| 2013/0192388 A1* | 8/2013 | Kono | ................. | G01F 5/00 |
| | | | | 73/861.47 |
| 2015/0168192 A1* | 6/2015 | Morino | ................. | G01F 1/696 |
| | | | | 73/202.5 |
| 2017/0248455 A1* | 8/2017 | Miki | ................. | G01F 1/6842 |
| 2017/0276526 A1 | 9/2017 | Taniguchi et al. | | |
| 2018/0306619 A1* | 10/2018 | Uenodan | ................. | G01F 1/684 |
| 2018/0372520 A1* | 12/2018 | Yamamoto | ................. | G01N 27/121 |

FOREIGN PATENT DOCUMENTS

| | | |
|---|---|---|
| JP | 2002-168669 A | 6/2002 |
| JP | 2005-201684 A | 7/2005 |
| JP | 2009-36639 A | 2/2009 |
| JP | 2015-17857 A | 1/2015 |
| JP | 2018197764 A * | 12/2018 |
| WO | WO 2012/049934 A1 | 4/2012 |
| WO | WO 2016/051940 A1 | 4/2016 |
| WO | WO 2017/073271 A1 | 5/2017 |

OTHER PUBLICATIONS

Japanese-language Written Opinion (PCT/ISA/237) issued in PCT Application No. PCT/JP2018/026641 dated Nov. 6, 2018 (four pages).
Japanese-language Office Action issued in Japanese Application No. 2019-540804 dated Mar. 16, 2021 with English translation (10 pages).
Extended European Search Report issued in European Application No. 18855044.6 dated Jun. 8, 2021 (eight (8) pages).

* cited by examiner

THERMAL-TYPE FLOWMETER

TECHNICAL FIELD

The present invention relates to a thermal-type flowmeter.

BACKGROUND ART

As a device to measure a mass flow rate of a measurement target gas flowing in a main passage, there is a thermal-type flowmeter. The thermal-type flowmeter is structured to take part of the measurement target gas flowing in a pipe (main passage) into a sub-passage, and guides the gas to a flow measurement unit. In recent years, a MEMS silicon element and the like are disposed in the flow measurement unit, and measure a mass flow rate in the pipe using a change in electric resistance caused by a cooling action of the flowing gas. The silicon element employs a diaphragm shape of a thin film. Therefore, there is a merit on that the silicon element shows a good thermal response performance, and thus there is a merit on high response and detection of fine flow rate. However, on the contrary, in a case where a dirty substance is attached, the performance is significantly changed.

PTL 1 discloses a technique of a thermal-type flowmeter which includes an electrostatic scattering mechanism in a bypass from a viewpoint of a countermeasure against contamination to avoid the attachment of a dirty substance to the flow measurement unit. According to the disclosure, there is proposed a thermal-type flowmeter in which a newly installed GND terminal is disposed in a housing, and a cover assembly with a conductive resin component over-molded and the GND terminal are pressed fit into so as to form the electrostatic scattering mechanism.

An object of the technique of PTL 1 is to provide a thermal-type flowmeter with high durability and reliability while suppressing the attachment of a dirty substance to the silicon element by removing or absorbing electric charges of the dirty substance entered in the bypass with the above configuration.

CITATION LIST

Patent Literature

PTL 1: DE 10 2010 020 264 A1

SUMMARY OF INVENTION

Technical Problem

The thermal-type flowmeter of the related art changes and adds four elements such as adding a component obtained by molding a conductive resin material besides a base components of a flow rate measurement to provide the electrostatic scattering mechanism, over-molding the component, adding the GND terminal, and adding a contact connecting mechanism using a press-fitting mechanism. The thermal-type flowmeter determines a flow rate accuracy according to an accuracy in dimension and a shape stability of a bypass in order to provide the flow measurement unit in the bypass.

For example, as described in an embodiment of PTL 1, in a case where an insulating resin is over-molded on the conductive resin material, there is a concern that the accuracy in dimension of the bypass becomes worse according to an increasingly accumulated tolerance compared to a single mold product of the related art.

In addition, as described in an embodiment of PTL 1, in a case where a component of the conductive resin material is used, carbon or graphite which is conductive with respect to the insulating resin material of the related art is necessarily compounded to the resin material. Therefore, there is a concern that strength is reduced compared to the insulating resin material of the related art.

In a case where a thermal change is added to the thermal-type flowmeter of the related art, a linear expansion difference is caused between the over-molded components. Therefore, there is a concern that a reliability is lowered by a shape deformation and a gap generated in a boundary.

In addition, in a case where a new GND terminal is added, the usage of a metal material is increased. Therefore, there is a concern that a cost of the thermal-type flowmeter is increased.

Further, in a connection portion, there is a concern that the reliability is lowered compared to the welding of the related art (welding, bonding, etc.) due to a linear expansion difference between a conductive resin component and a metal component and a contact connection.

The present invention has been made in view of the problem, and an object thereof is to provide a thermal-type flowmeter which can form an electrostatic scattering mechanism while preventing a reduction of a flow rate accuracy and reliability, and an increase of cost of the thermal-type flowmeter compared to the related art.

Solution to Problem

In order to achieve the above object, a thermal-type flowmeter of the present invention is attached to a main passage, and includes a sub-passage into which part of a measurement target gas flowing in the main passage is taken, a flow rate detection element which is disposed in the sub-passage, and a supporting body which supports the flow rate detection element, a circuit substrate to which the supporting body is fixed. The flow rate detection element includes a detection surface to detect a flow rate of the measurement target gas, and is disposed such that the detection surface faces the circuit substrate.

Advantageous Effects of Invention

According to a thermal-type flowmeter of the present invention, a supporting body supporting a flow rate detection element is fixed to a circuit substrate, and a detection surface of the flow rate detection element is disposed to face the circuit substrate. Therefore, it is possible to prevent a reduction of a flow rate accuracy and reliability, and an increase of cost compared to the related art.

Other features of the present invention will be clear from the description and the accompanying drawings. In addition, objects, configurations, and effects besides the above description will be apparent through the explanation on the following embodiments.

DESCRIPTION OF EMBODIMENTS

Hereinafter, embodiments of a thermal-type flowmeter of the present invention will be described with reference to the drawings.

First Embodiment

Figure 1:
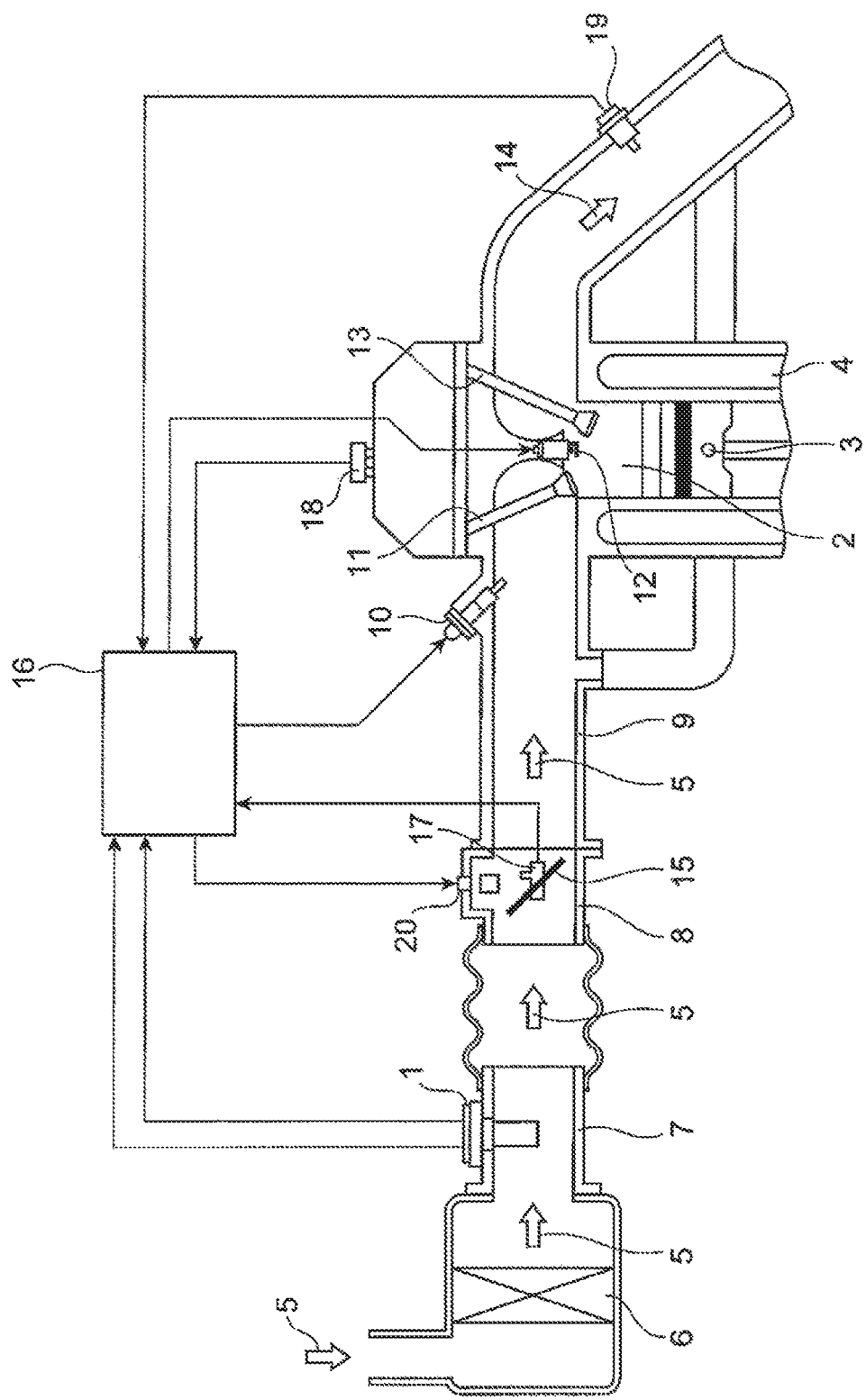
FIG. 1 is a schematic view illustrating an example of a system which includes a thermal-type flowmeter according to a first embodiment of the present invention.

FIG. 1 is a schematic view illustrating an example of an internal combustion engine control system of an electronic fuel injection type which includes a thermal-type flowmeter 1 according to a first embodiment of the present invention. In the system, on the basis of the operation of an internal combustion engine 4 which includes an engine cylinder 2 and an engine piston 3, an intake air is sucked from an air cleaner 6 as a measurement target gas 5, and guided to a combustion chamber of the engine cylinder 2 through a main passage 7 such as an intake pipe, a throttle body 8, and an intake manifold 9.

The flow rate of the measurement target gas 5 (intake air) guided to the combustion chamber is measured by the thermal-type flowmeter 1, and fuel is supplied by a fuel injection valve 10 on the basis of the measured flow rate. The fuel and the measurement target gas 5 (intake air) are guided to the combustion chamber in the state of an air-fuel mixture. Further, in this embodiment, the fuel injection valve 10 is provided in an intake port of the internal combustion engine. The fuel injected to the intake port is mixed with the measurement target gas 5 (intake air) to be an air-fuel mixture, guided to the combustion chamber through an intake valve 11, and combusted to generate mechanical energy.

The thermal-type flowmeter 1 can be used not only to a type in which fuel is injected to the intake port of the internal combustion engine illustrated in FIG. 1, but also to a type in which fuel is directly injected to each combustion chamber. In both types, a measurement method of control parameters including a usage of the thermal-type flowmeter 1 and a control method of the internal combustion engine including a fuel supply amount and an ignition timing is substantially the same in basic concepts. FIG. 1 illustrates a type of injecting fuel to the intake port as a representative example of both types.

The fuel and the air guided to the combustion chamber are in a state where the fuel and the air are mixed. The air-fuel mixture is explosively combusted by spark ignition of an ignition plug 12 to generate mechanical energy. The gas after explosion is guided from an exhaust valve 13 to an exhaust pipe, and discharged as an exhaust gas 14 from the exhaust pipe to the outside of the vehicle. The flow rate of the measurement target gas 5 (intake air) guided to the combustion chamber is controlled by a throttle valve 15 of which the opening is changed on the basis of an operation of an accelerator pedal. The fuel supply amount is controlled on the basis of the flow rate of the intake air guided to the combustion chamber. An operator controls the flow rate of the intake air guided to the combustion chamber by controlling the opening of the throttle valve 15, so that the mechanical energy generated by the internal combustion engine can be controlled.

The flow rate and the temperature of the measurement target gas 5 (intake air) which is taken into the air cleaner 6 and flows in the main passage 7 are measured by the thermal-type flowmeter 1 attached to the main passage 7. Electric signals representing the measured flow rate and the measured temperature of the intake air are input from the thermal-type flowmeter 1 to a control device 16. In addition, the output of a throttle angle sensor 17 which measures the opening of the throttle valve 15 is input to the control device 16. Further, the output of a rotation angle sensor 18 is input to the control device 16 to measure the engine piston 3 of the internal combustion engine, positions and states of the intake valve 11 and the exhaust valve 13, and a rotation speed of the internal combustion engine. The output of an oxygen sensor 19 is input to the control device 16 to measure a state of a mixture ratio between the fuel amount and the air amount of the exhaust gas 14.

The control device 16 calculates a fuel injection amount and an ignition timing on the basis of the output of the thermal-type flowmeter 1 such as a flow rate of the intake air, a humidity, a temperature, and a rotation speed of the internal combustion engine from the rotation angle sensor 18. On the basis of these calculation results, the fuel amount supplied from the fuel injection valve 10 and the ignition timing of the ignition plug 12 are controlled. The fuel supply amount and the ignition timing are actually controlled on the basis of an intake temperature measured by the thermal-type flowmeter 1, a change state of the throttle angle, a change state of the rotation speed of the engine, and a state of the air-fuel ratio measured by the oxygen sensor 19. The control device 16 controls an air amount bypassing the throttle valve 15 using an idle air control valve 20 in an idle operation state of the internal combustion engine, and controls the rotation speed of the internal combustion engine in the idle operation state.

The fuel supply amount and the ignition timing which are main control amounts of the internal combustion engine both are calculated using the output of the thermal-type flowmeter as a main parameter. Therefore, the improvement in measurement accuracy of the thermal-type flowmeter 1, the suppression from change with time, and the improvement in reliability are important to improve the control accuracy and to secure the reliability of the vehicle. Particularly, in recent years, a desire for saving fuel of the vehicle is extremely increased, and a desire for cleaning the exhaust gas is extremely increased. In order to satisfy these desires, it is most important to improve the measurement accuracy of the flow rate of the measurement target gas 5 (intake air) measured by the thermal-type flowmeter 1.

Figure 2A:
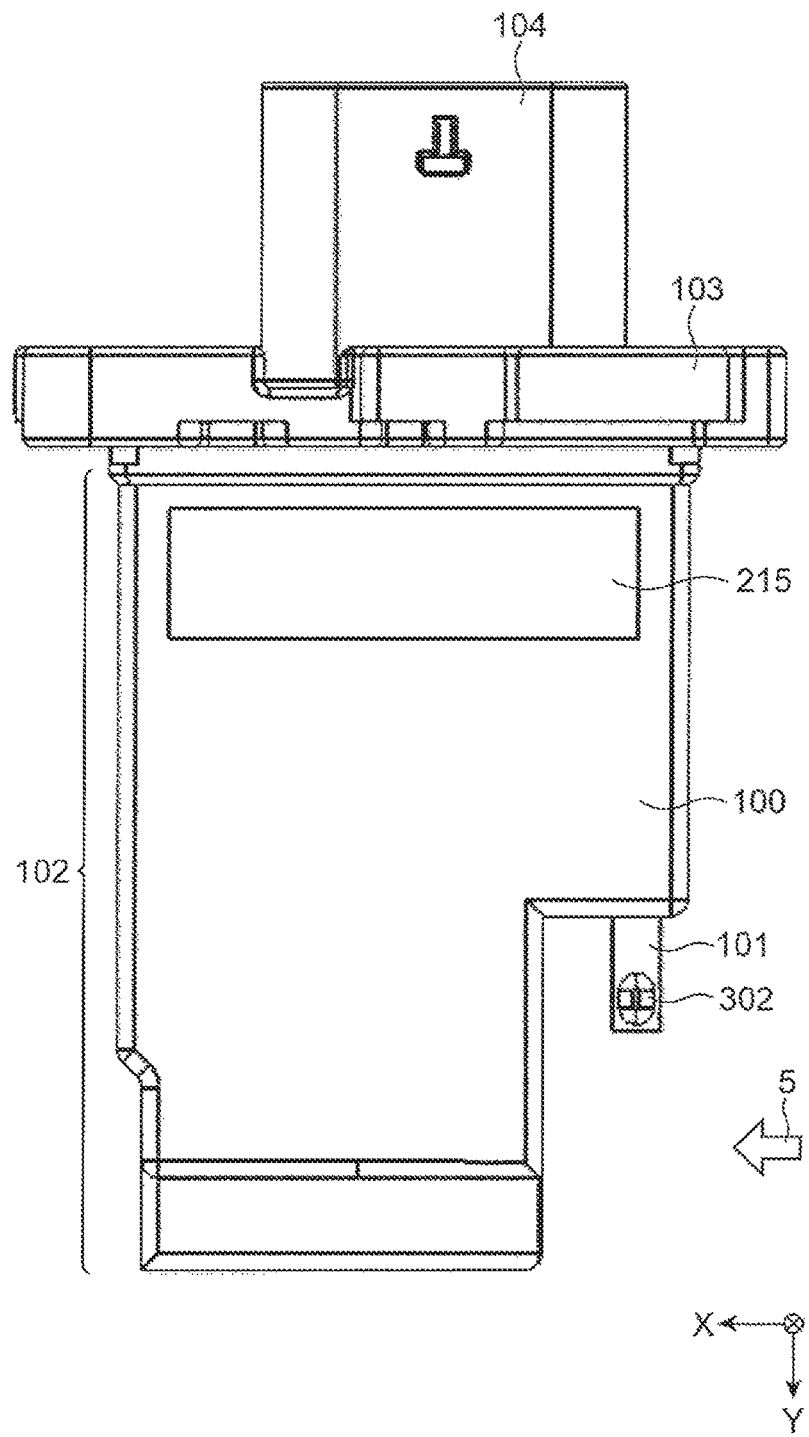
FIG. 2A is a front view of the thermal-type flowmeter according to the first embodiment of the present invention.

FIG. 2A is a front view of the thermal-type flowmeter 1 according to this embodiment. FIGS. 2B, 2C, 2D, 2E, and 2F illustrate a right side view, a rear view, a left side view, a top view, and a bottom view of the thermal-type flowmeter illustrated in FIG. 2A.

The thermal-type flowmeter 1 includes a housing 100 and the substrate (circuit substrate) 101. The substrate 101 is configured of a printed circuit board, and includes a wide-flat cooling surface. Therefore, a casing body 102 of the thermal-type flowmeter 1 is reduced in air resistance, and is configured to be easily cooled down by the measurement target gas flowing in the main passage 7.

The casing body 102 of the thermal-type flowmeter 1 is, for example, a substantially rectangular flat shape, and is inserted to the intake pipe and disposed in the main passage 7. While the details will be described below, the casing body 102 is provided with a sub-passage to which part of the measurement target gas 5 (fluid) flowing in the main passage 7 is taken in.

Further, in the following, the portions of the thermal-type flowmeter 1 may be explained using an XYZ orthogonal coordinate system in which a longitudinal direction of the casing body 102 substantially in parallel to the flow of the measurement target gas 5 in the main passage 7 is an X-axis direction, a height direction of the casing body 102 substantially in parallel to a radial direction of the main passage 7 perpendicular to the longitudinal direction is a Y-axis direction, and a thickness direction of the casing body 102 perpendicular to the longitudinal direction and the height direction is a Z-axis direction.

Figure 2B:
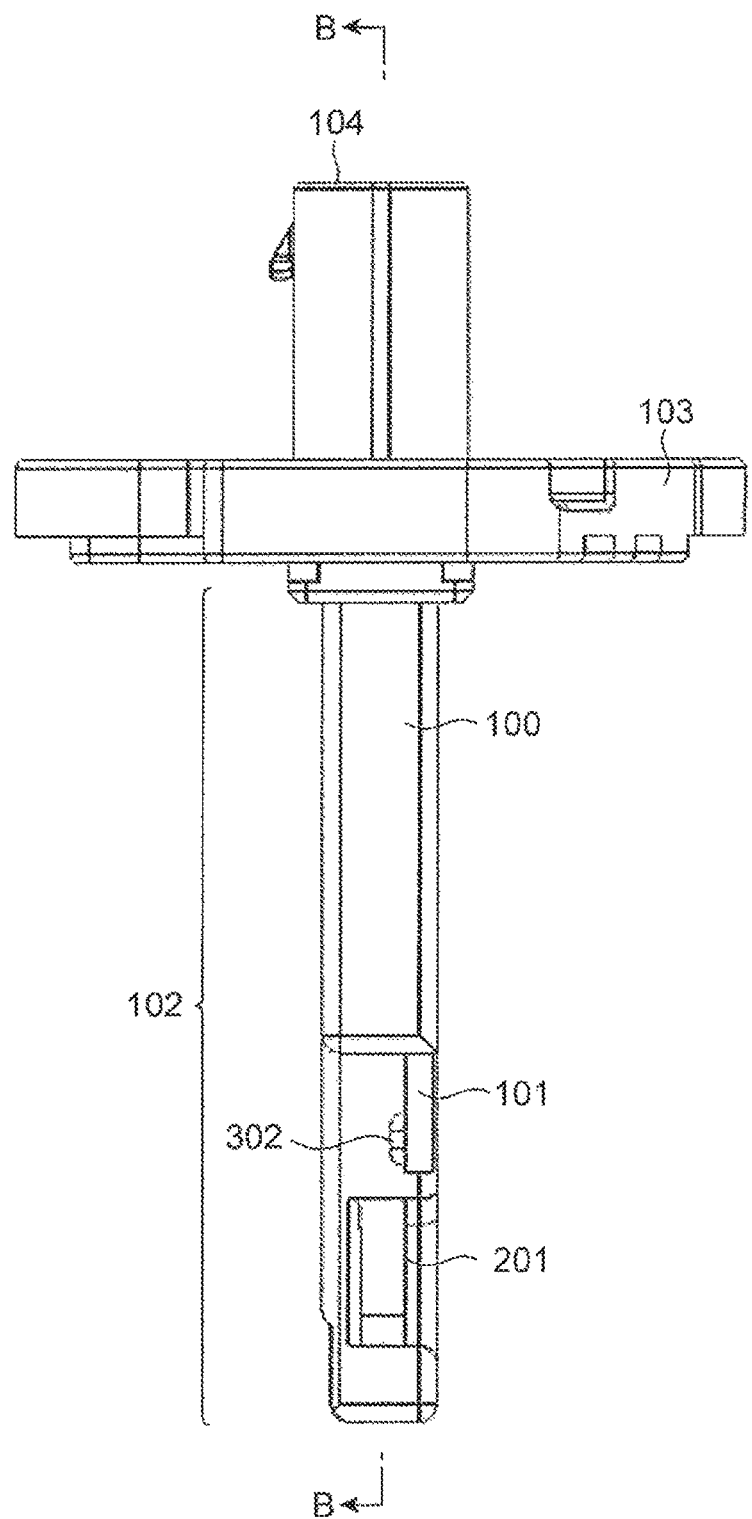
FIG. 2B is a right side view of the thermal-type flowmeter illustrated in FIG. 2A.
Figure 2C:
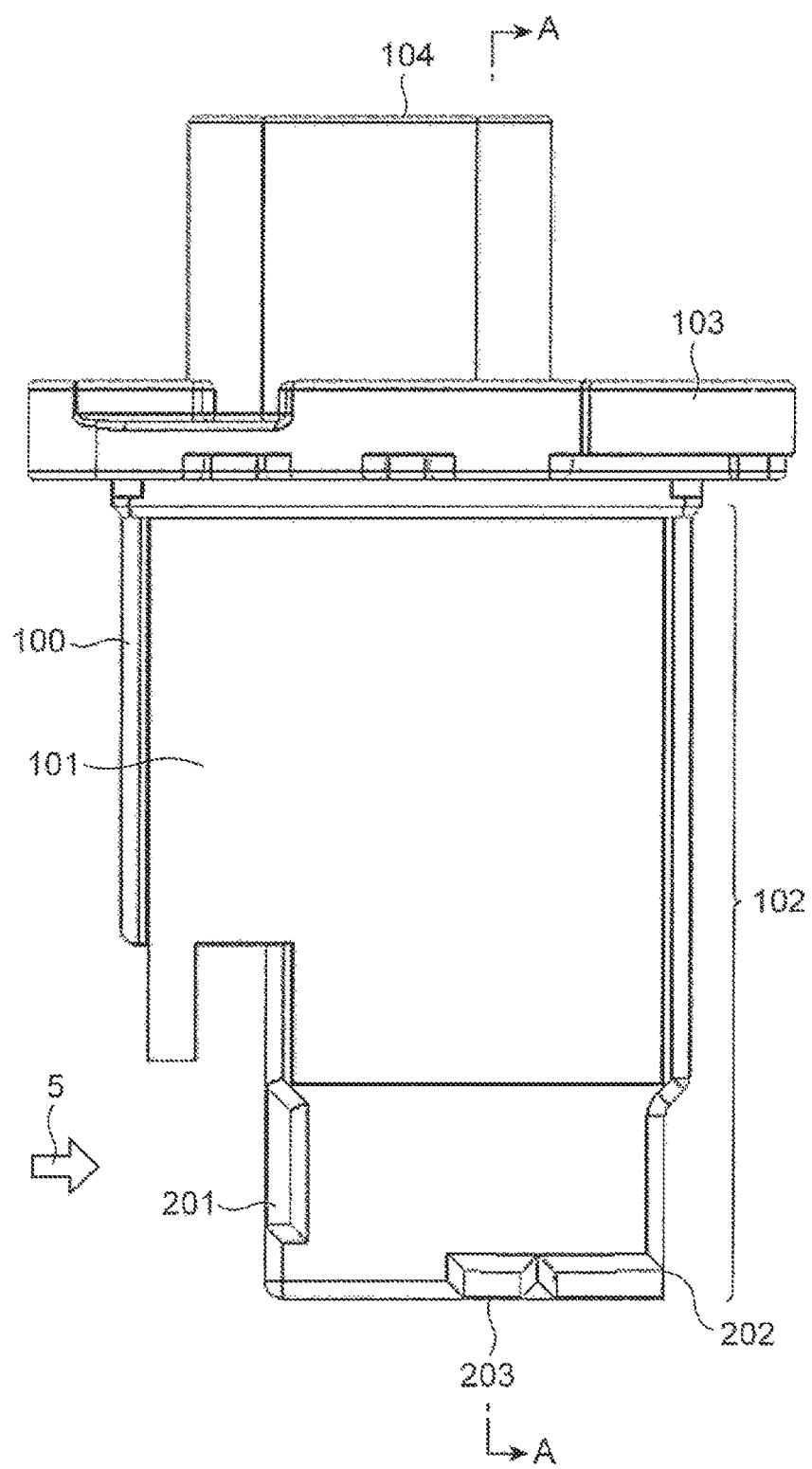
FIG. 2C is a rear view of the thermal-type flowmeter illustrated in FIG. 2A.
Figure 2D:
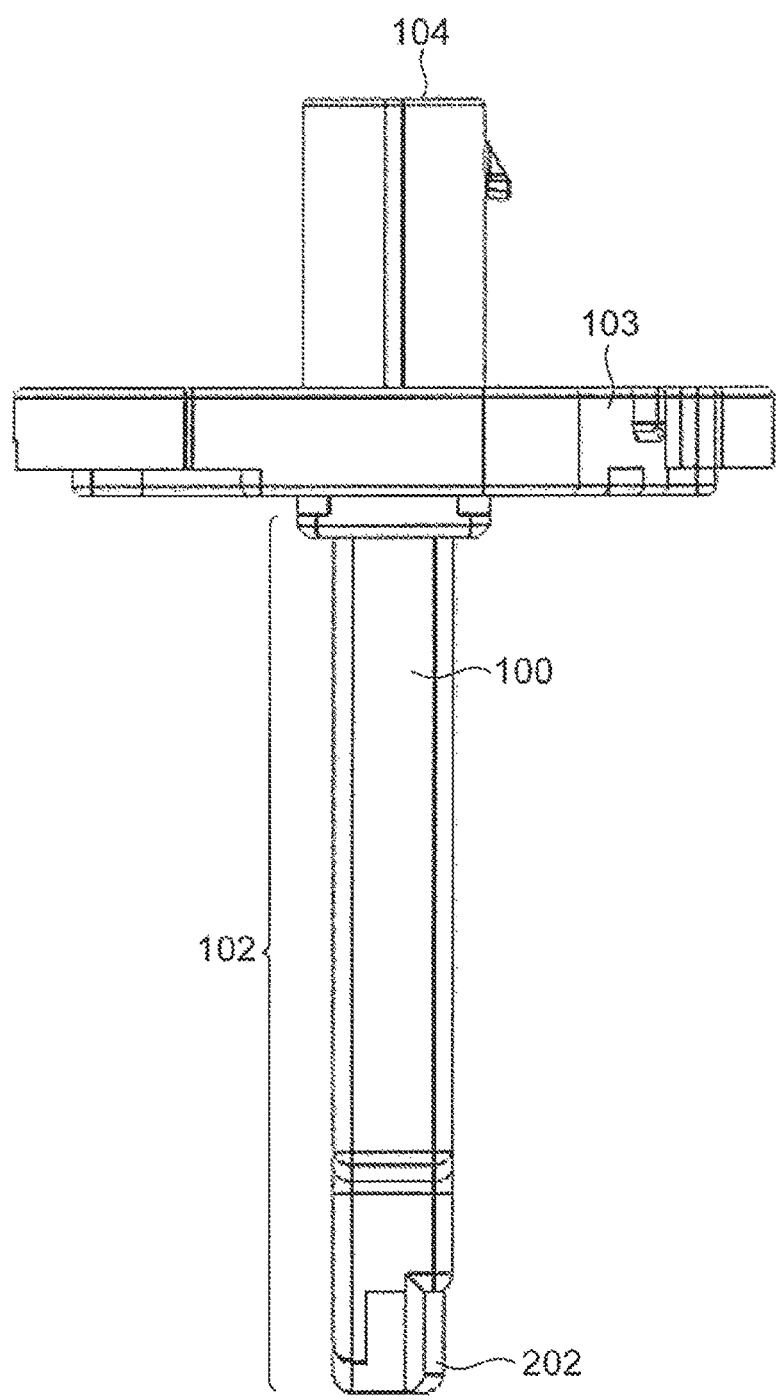
FIG. 2D is a left side view of the thermal-type flowmeter illustrated in FIG. 2A.
Figure 2E:
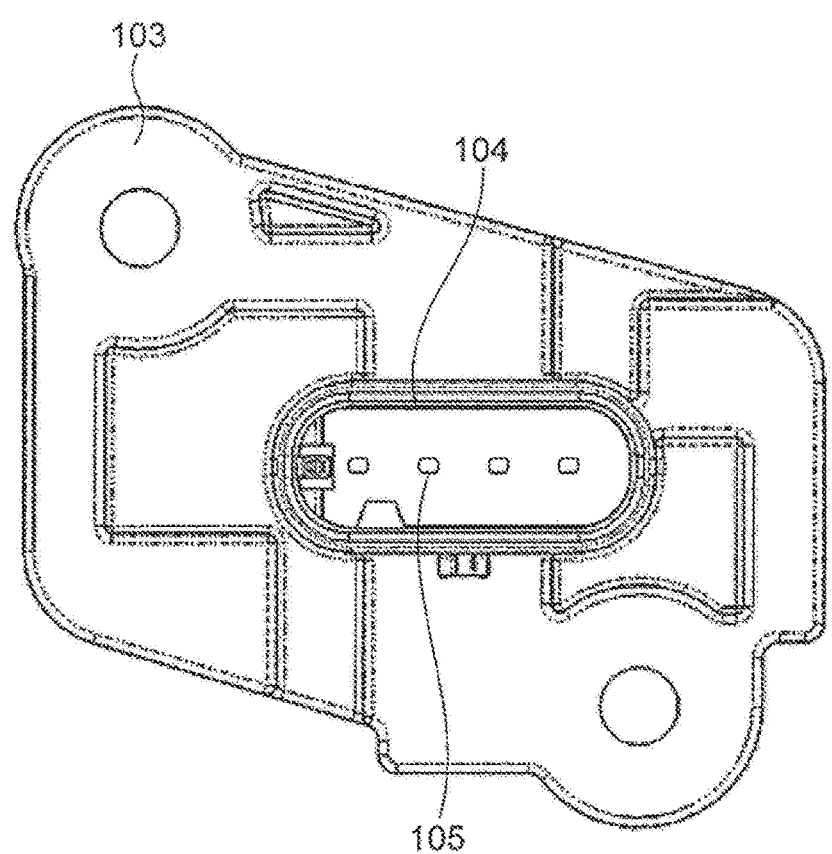
FIG. 2E is a top view of the thermal-type flowmeter illustrated in FIG. 2A.
Figure 2F:
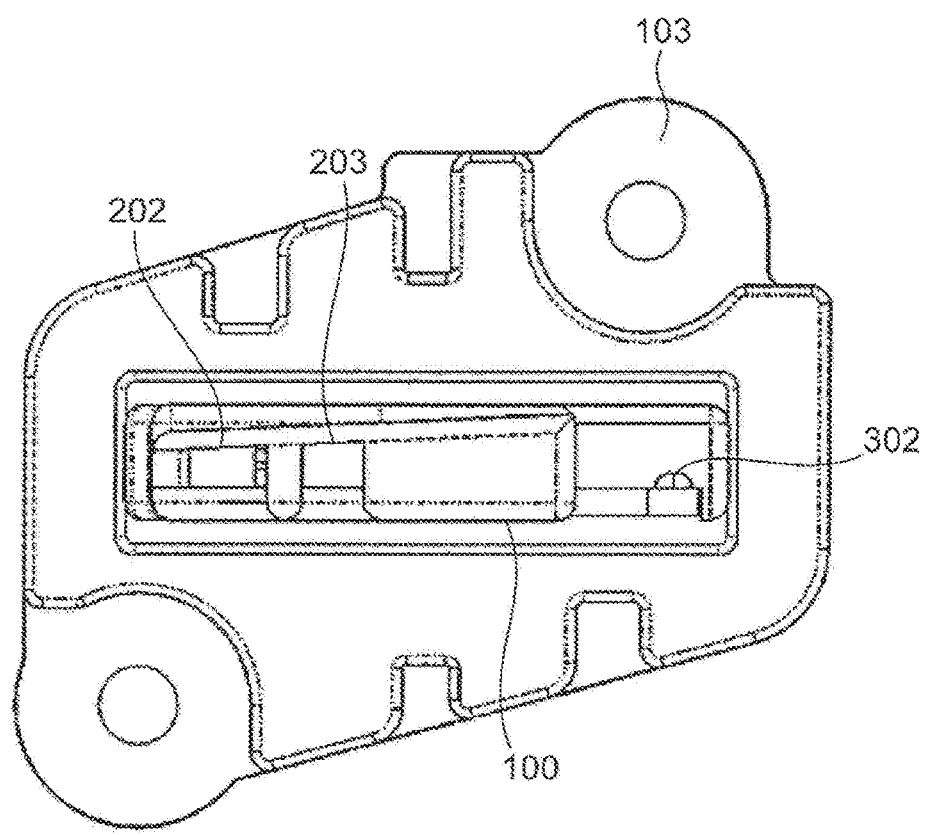
FIG. 2F is a bottom view of the thermal-type flowmeter illustrated in FIG. 2A.

The casing body 102 has a shape extending along the Y-axis direction from the outer wall of the main passage 7 toward the center, but the thickness in the Z-axis direction is formed in a thin plate shape as illustrated in FIGS. 2B and 2D. In other words, the casing body 102 of the thermal-type flowmeter 1 has a shape in which the thickness is thin along the side surface, and the front surface is substantially a rectangular shape. In this way, the thermal-type flowmeter 1 is made to have a small fluid resistance with respect to the measurement target gas 5 so as to be provided with a sufficiently long sub-passage.

In the base end portion of the casing body 102, there are provided a flange 103 to fix the thermal-type flowmeter 1 to the intake pipe, and a connector terminal 105 which is a unit electrically connected to a connector 104 exposed outside the intake pipe for the electrical connection with the control device 16. The casing body 102 is supported in a cantilever shape by fixing the flange 103 to the intake pipe. The substrate 101 is formed in almost all of the rear surface of the casing body 102 as illustrated in FIG. 2C. Therefore, the substrate 101 is cooled by the measurement target gas which flows in the main passage 7.

Figure 3A:
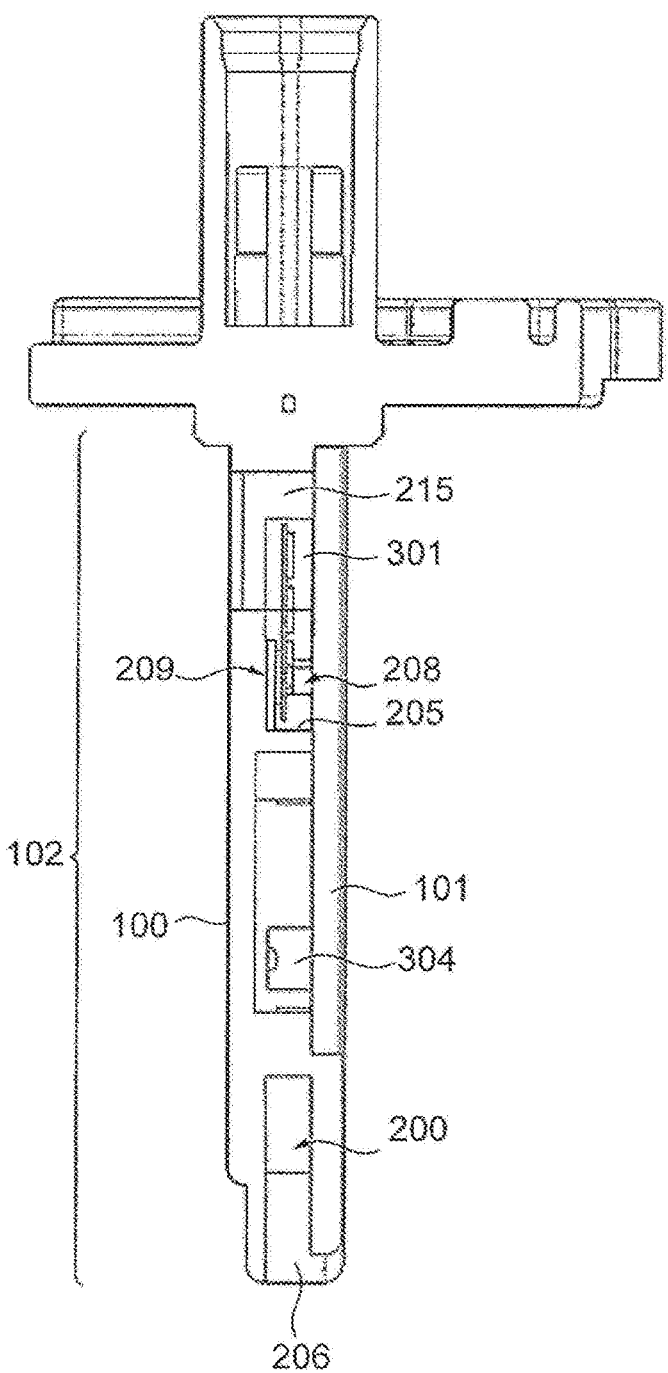
FIG. 3A is a cross-sectional view taken along line A-A of the thermal-type flowmeter illustrated in FIG. 2C.
Figure 3B:
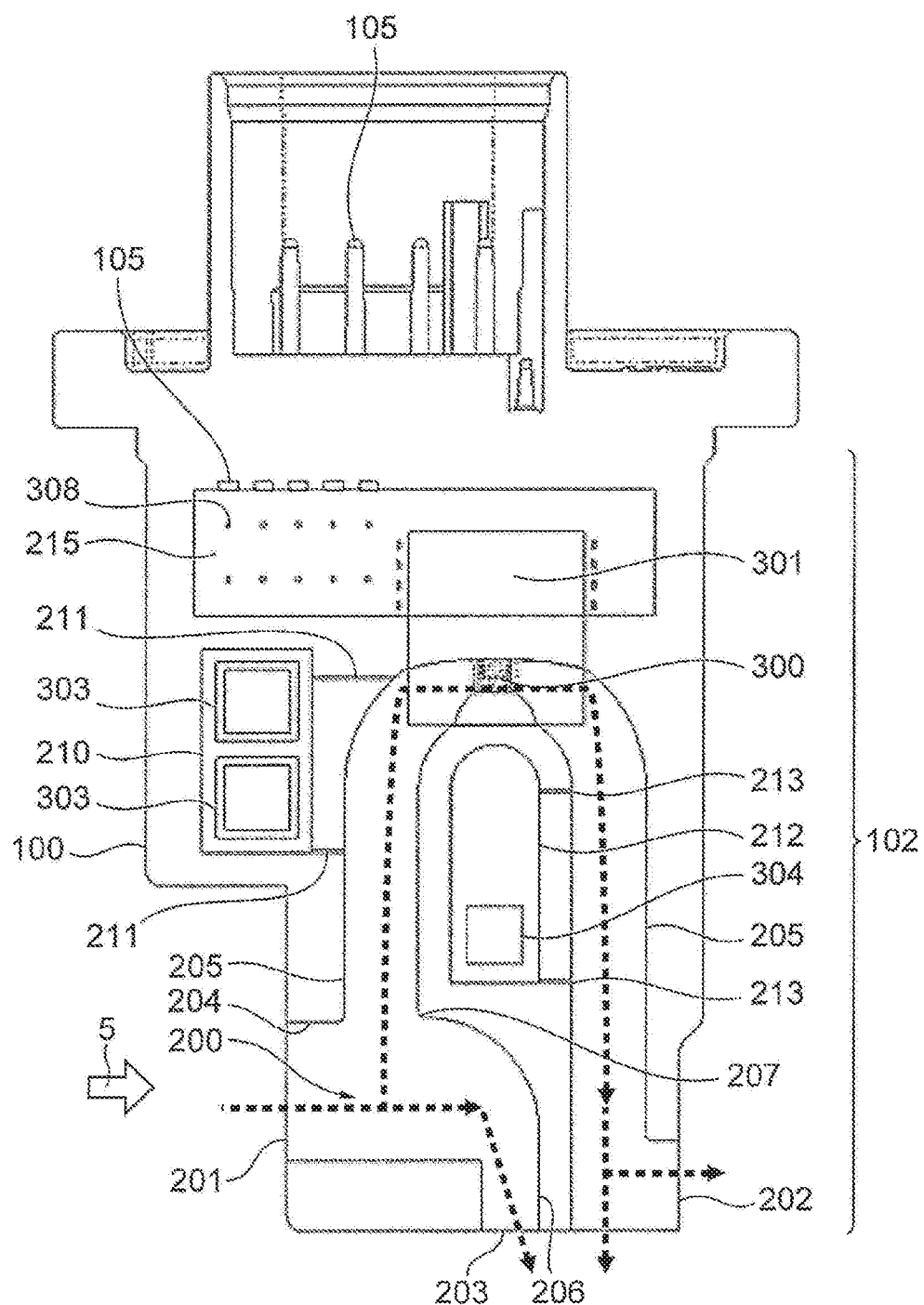
FIG. 3B is a cross-sectional view taken along line B-B of the thermal-type flowmeter illustrated in FIG. 2B.
Figure 3C:
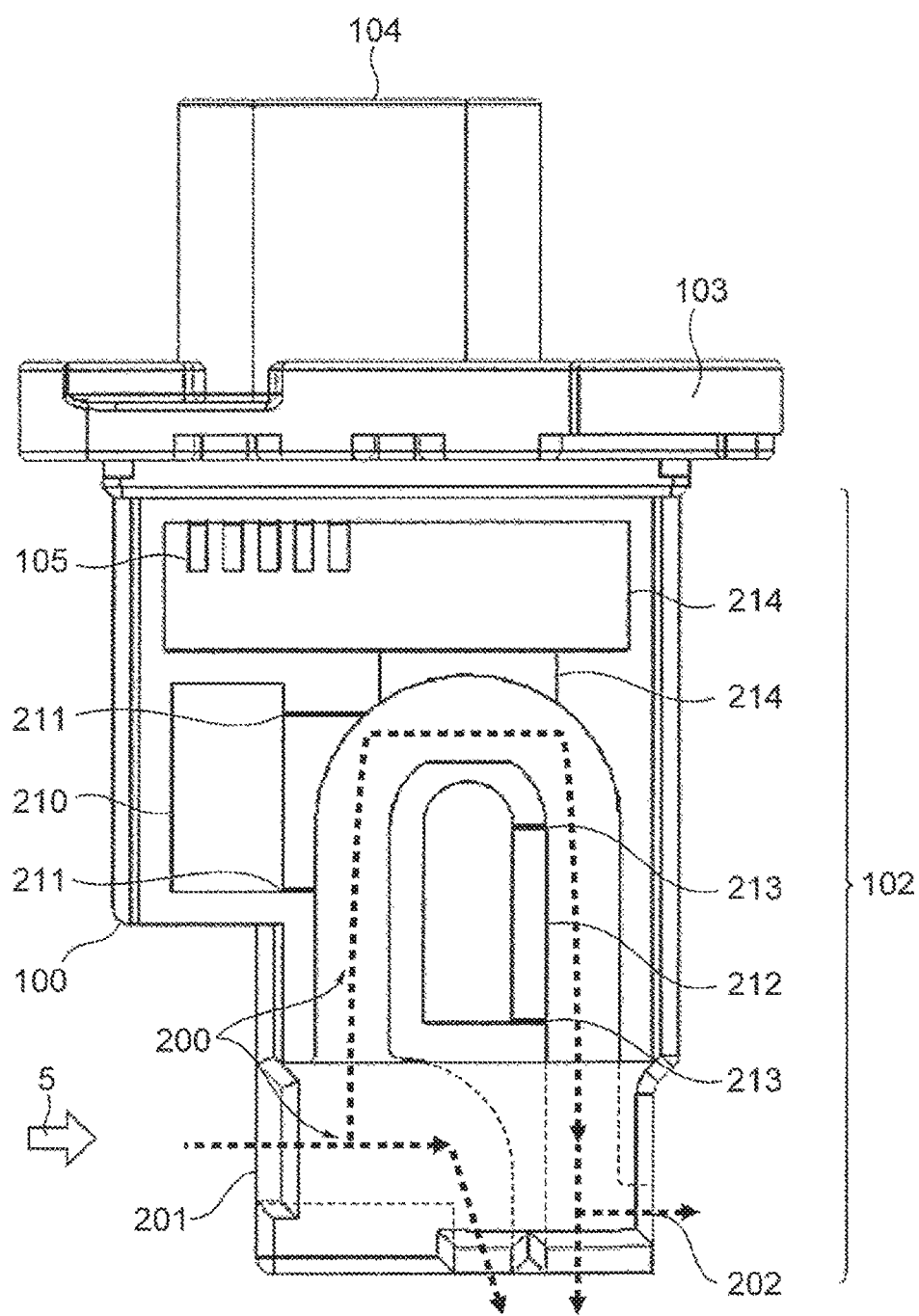
FIG. 3C is a rear view of a state where a substrate 101 of the thermal-type flowmeter 1 illustrated in FIG. 2C is removed.
Figure 3D:
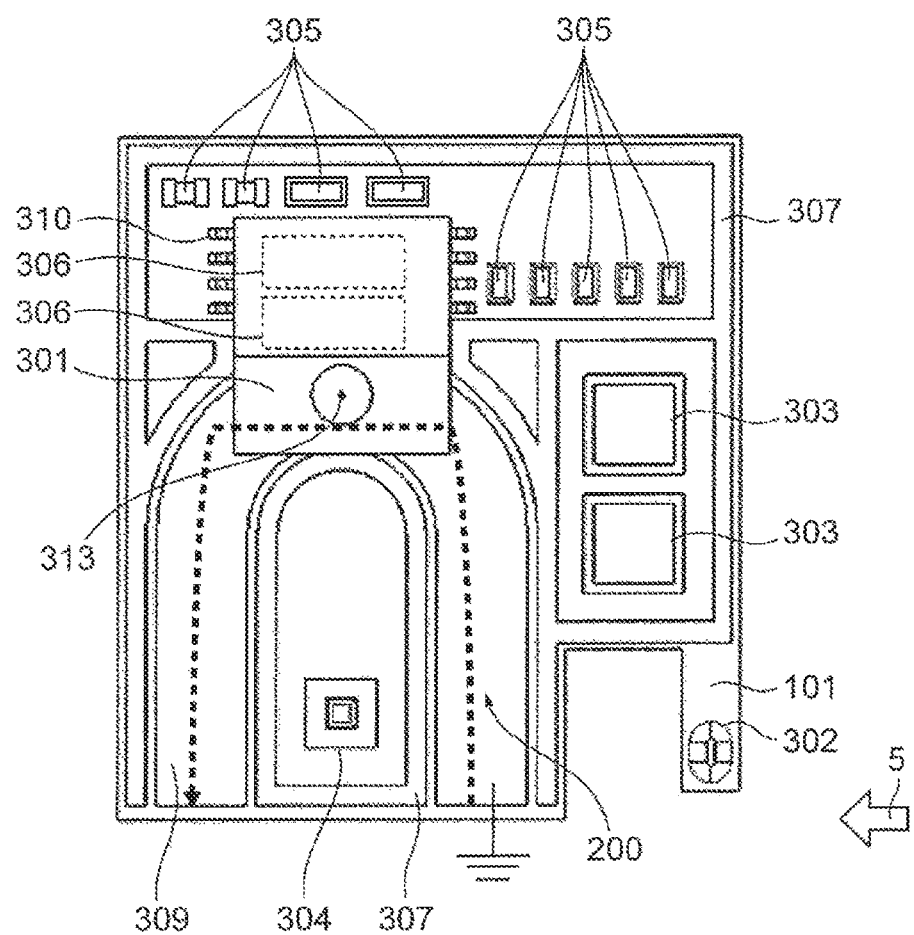
FIG. 3D is a front view of a state where a housing 100 of the thermal-type flowmeter 1 illustrated in FIG. 2A is removed.
Figure 3E:
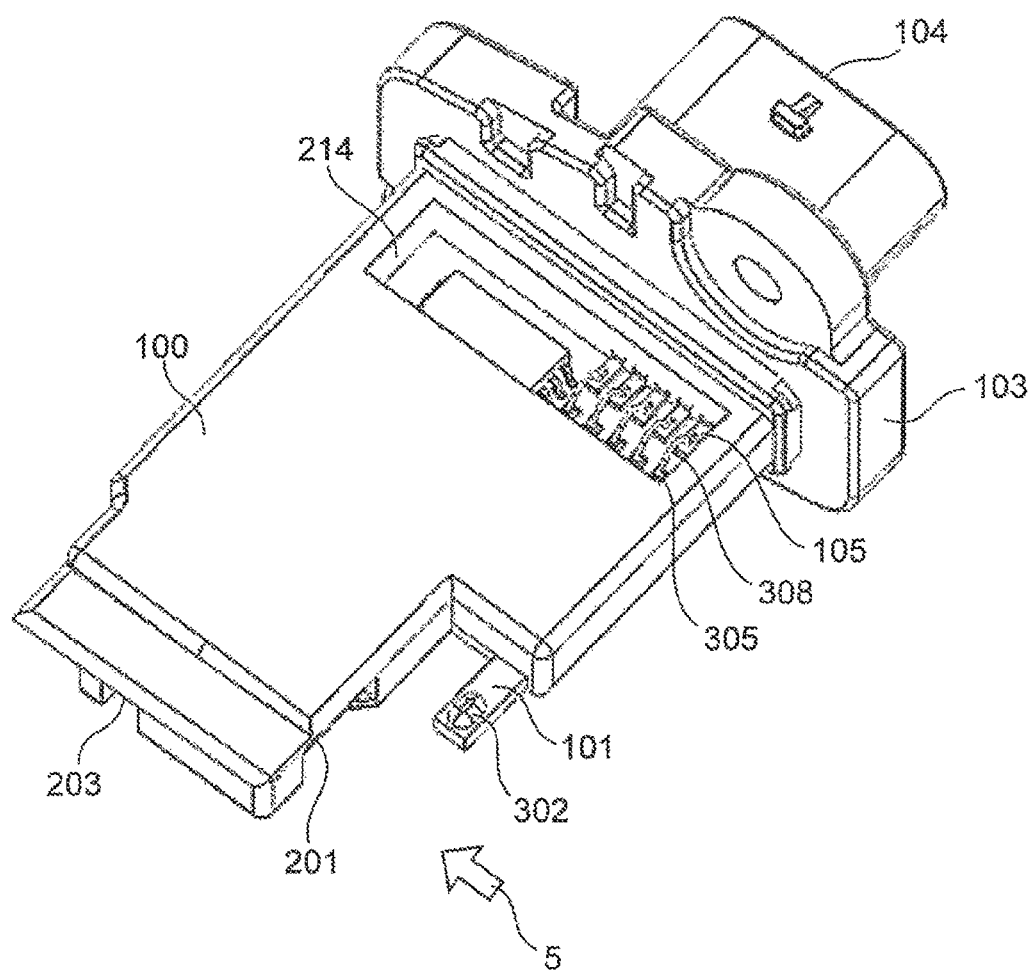
FIG. 3E is a perspective view in which a seal material 215 of FIG. 2A is removed.
Figure 3F:
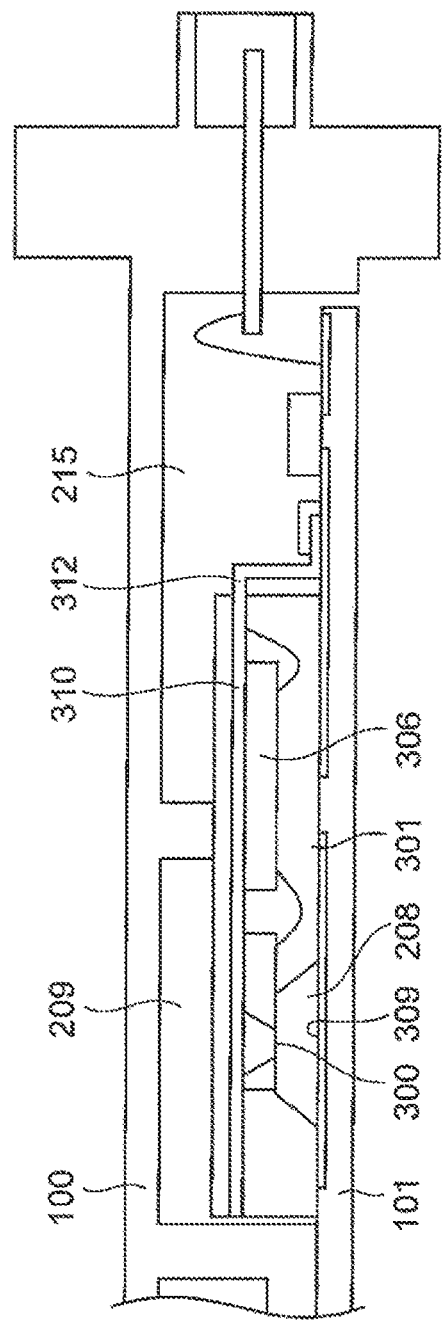
FIG. 3F is a diagram schematically illustrating main parts of FIG. 3A on a magnified scale.

FIG. 3A is a cross-sectional view taken along line A-A of the thermal-type flowmeter illustrated in FIG. 2C. FIG. 3B is a cross-sectional view taken along line B-B of the thermal-type flowmeter illustrated in FIG. 2B. FIG. 3C is a rear view of a state where the substrate of the thermal-type flowmeter 1 illustrated in FIG. 2C is removed. FIG. 3D is a front view of a state where the housing of the thermal-type flowmeter 1 illustrated in FIG. 2A is removed. FIG. 3E is a perspective view in which a seal material 215 of FIG. 2A is removed. FIG. 3F is a diagram schematically illustrating main parts of FIG. 3A on a magnified scale.

In one end which is a tip end side of the housing 100 and is disposed at a position on the upstream side in a main flow direction, there is provided an entrance 201 through which part of the measurement target gas 5 such as an intake air (fluid) flowing in the main passage 7 is taken into a sub-passage 200. In addition, similarly, in the other end where is a tip end side of the housing 100 and is disposed at a position on the downstream side in the main flow direction, there is provided an exit 202 to return the measurement target gas 5 from the sub-passage 200 to the main passage 7. Further, there are provided an exhaust port 203 (second exit) to discharge part of the measurement target gas 5 flowing in the sub-passage 200. In this way, the entrance 201, the exit 202, and the exhaust port 203 to take the measurement target gas 5 flowing in the main passage 7 into the sub-passage 200 is provided on a tip end side of the casing body 102 which extends from the flange 103 toward the center direction of the radial direction of the main passage 7.

In the housing 100, a circuit package 301 is stored in a state of being fixed to the substrate 101. The circuit package 301 includes a flow measurement unit 300 to measure a flow rate of the measurement target gas 5 which flows in the sub-passage 200.

The circuit package 301 is a resin package which is configured by integrally molding the flow measurement unit 300 with a resin material to be a supporting body to support the flow measurement unit 300. The flow measurement unit 300 includes a flow rate detection element. The flow rate detection element includes a detection surface which detects the flow rate of the measurement target gas. The detection surface of the flow rate detection element is exposed to the surface of the circuit package 301.

Then, a sub-passage groove is formed to form the sub-passage 200 in the housing 100. The sub-passage groove is recessively provided on one surface side of the housing 100, and the substrate 101 is covered to complete the sub-passage 200 (bypass). In addition, the vicinities of the entrance 201, the exit 202, and the exhaust port 203 are integrally molded to form the sub-passage 200. At the time of molding the housing 100 (resin mold procedure), the molding may be performed using dies for the front surface, the rear surface, the right surface, the left surface, the top surface, and the lower surface. For example, the shape is formed in an integral die in this embodiment, but the length of the substrate 101 may be extended and divided.

In the thermal-type flowmeter 1 configured as in this embodiment, the size in the thickness direction (Z-axis direction) of the housing 100 may be compact by making the substrate 101 have a function of a cover component such as a conventional lid. It is possible to realize the thermal-type flowmeter 1 of a low loss at a low pressure without hindering the flow of gas in the main passage 7.

The sub-passage groove includes a sub-passage groove 204 to take the fluid flowing in the main passage 7 into the sub-passage 200, a first groove 205 to guide the flow toward the flow measurement unit 300, and a second groove 206 to guide the flow toward the exhaust port 203 which are formed in the housing 100.

The sub-passage groove 204 is formed in the tip end of the housing 100 to extend in a straight line toward a branch groove 207 to be along the main flow of the measurement target gas 5.

The first groove 205 is provided to deflect part of the flow toward the base end side (Y-axis direction) of the housing 100 by the branch groove 207, smoothly curved toward the end side of the housing 100, proceeding to the tip end of the housing 100, and connected to the exit 202. With the smooth curve, dust can be separated to the outside of the flow by an inertia separation. A total amount of foreign matters toward the flow measurement unit 300 can be reduced, and the degradation of a detection performance can be prevented.

The second groove 206 is provided to deflect part of the flow toward the tip end side (Y-axis direction) of the housing 100 by the branch groove 207, smoothly curved, and connected to the exhaust port 203. With the exhaust port 203, large and small foreign matters such as dust and water drops can be discharged to the outside. A total amount of foreign matters entering the sub-passage 200 which faces the flow measurement unit 300 can be reduced, and the degradation of a detection performance can be prevented.

The circuit package 301 is provided to be further separated with respect to the thickness direction (Z-axis direction) of the casing body 102 from the sub-passage 200. Therefore, the flow of the measurement target gas is separated to the sub-passage 208 configured in cooperation with the substrate 101 and the circuit package 301 and the sub-passage 209 configured in cooperation with the circuit package 301 and the first groove 205. Then, the sub-passage 208 and the sub-passage 209 are formed to have a flow passage having a cross-sectional area smaller than the sub-passage 200. Foreign matters such as dust can be deflected to the sub-passage 209 by differentiating the speed in the sub-passage 208 and the sub-passage 209 using a pressure loss in the passage. A total amount of foreign matters entering the sub-passage 208 facing the flow measurement unit 300 can be reduced, and the degradation in a detection performance can be prevented.

In the thermal-type flowmeter 1 configured as in this embodiment, it is possible to improve reliability on a dirty substance, and to realize the thermal-type flowmeter 1 having high durability and reliability.

At a position on a further upstream side from the entrance 201 located on the tip end side of the housing 100, a temperature measurement unit 302 is provided to measure a temperature of the measurement target gas 5 flowing in the main passage 7. In this way, the temperature measurement unit 302 to measure the temperature of the measurement target gas 5 flowing in the main passage 7 is provided to protrude to the tip end side of the casing body 102 which extends from the flange 103 toward the center direction of the radial direction of the main passage 7.

In the thermal-type flowmeter 1 configured as described in this embodiment, the gas in a portion separated from an inner wall surface of the main passage 7 can be taken into the sub-passage 200. The temperature of the inner wall surface of the main passage 7 is hardly influenced. The flow rate of gas and the measurement accuracy of temperature can be suppressed from being lowered. In addition, the fluid resistance is large in the vicinity of the inner wall surface of the main passage 7, and the liquid speed becomes lowered compared to an average liquid speed of the main passage 7. In the thermal-type flowmeter 1 of this embodiment, the sub-passage 200 is provided on the tip end side of the casing body 102 which is thin and long and extends from the flange 103 toward the center of the main passage 7, and on the upstream side of the entrance 201. Therefore, a high fluid speed of gas in the center portion of the main passage 7 can be taken into the sub-passage 200.

In the casing body 102, there are disposed a pressure measurement unit 303 to measure a pressure of the measurement target gas 5 flowing in the main passage 7, and a humidity measurement unit 304 to measure a humidity of the measurement target gas 5 flowing in the main passage 7.

In the housing 100, a recessed groove 210 is formed to store the pressure measurement unit 303, and the substrate 101 to which the pressure measurement unit 303 is fixed is fitted to the housing 100 to form a storage chamber for pressure measurement. The storage chamber is connected to the sub-passage 200 in the middle of the sub-passage through a slit 211 to take the flow of the measurement target gas 5.

In addition, similarly, in the housing 100, there are formed a recessed groove 212 to store the humidity measurement unit 304, and a storage chamber for the pressure measurement by fitting the substrate 101 fixed by the humidity measurement unit 304 to the housing 100. The storage chamber is connected to the sub-passage 200 in the middle of the sub-passage through a slit 213 to take the flow of the measurement target gas 5.

In the thermal-type flowmeter 1 configured as in this embodiment, a foreign matter such as dust and water drops is discharged to the outside, so that a total amount of foreign matters toward the sub-passage 200 can be reduced. It is possible to prevent that the detection performance of the pressure measurement unit 303 and the humidity measurement unit 304 is degraded. In this embodiment, the slits 211 and 213 are provided in the sub-passage 200. However, for example, a plurality of slits and holes may be directly provided in the housing 100 and the substrate 101 to take the flow of the measurement target gas 5.

In the substrate 101, the circuit package 301, the temperature measurement unit 302, the pressure measurement unit 303, the humidity measurement unit 304, an electronic component 305 such as a capacitor are disposed which are integrally molded with the flow measurement unit 300. In addition, a circuit component 306 which controls a plurality of measurement units is disposed in the circuit package 301. The circuit component 306 may be configured by an LSI, a microcomputer, or both of them. In addition, the mounting components are connected and fixed to the substrate 101 by solder or conductive paste. In the thermal-type flowmeter 1 configured as in this embodiment, the components can be mounted in the substrate 101 by a typical mounter. Therefore, a working efficiency of a substrate mounting procedure can be increased.

In the other configurations of this embodiment, for example, the circuit component 306 may be disposed in the substrate 101, or the electronic component 305 such as a capacitor (circuit protection) may be partially disposed in the circuit package 301. In addition, in this embodiment, the circuit package 301, the temperature measurement unit 302, the pressure measurement unit 303, the humidity measurement unit 304, the electronic component 305 such as a capacitor are mounted, in which any combination of positions in the configuration is acceptable. The wiring pattern of the circuit substrate 101 may be optimally disposed according to requirements. In addition, only a required measurement unit or an electronic component may be added or eliminated in the configurations of the common circuit substrate 101. A large number of types of the thermal-type flowmeter 1 may be realized. In addition, the housing 100 is used as a common component, so that the manufacturing can be made without any change in assembly lines. Therefore, the number of man-hours can be reduced, and the thermal-type flowmeter 1 can be realized at a low cost.

In the substrate 101, there is disposed the electronic component 305 (electrode pad) for the connection with the connector terminal 105 (electrical connection unit). In the housing 100, there are formed the circuit package 301 and a recessed groove 214 which stores the electronic component 305 such as a capacitor and an electrode pad. In the substrate 101, an adhesive 307 is disposed for the bonding to the housing 100, and the substrate 101 is fitted to the housing 100 to form the configuration as illustrated in FIG. 3E.

As an electrical connection method, the connector terminal 105 and the electronic component 305 (electrode pad) are bonded by a wire bonding 308. The circuit package 301, the electronic component 305 such as a capacitor and an electrode pad, the connector terminal 105, and the wire bonding 308 which are integrated in the recessed groove 214 are exposed to the measurement target gas 5 flowing in the main passage 7. Therefore, there is a need to protect from a dirty substance (corrosive gas, liquid, etc.) which is tolerant of permeability. In this embodiment, as illustrated in FIG. 2A, 3A, or 3B, the seal material 215 such as gel or adhesive is filled for the protection.

According to the configuration as in this embodiment, it is possible to improve reliability on a dirty substance which is tolerant of permeability, and to realize the thermal-type flowmeter 1 having high durability and reliability.

In addition, the casing body 102 is supported in a cantilever shape by fixing the flange 103 to the intake pipe. Therefore, for example, the strength of the base end portion of the casing body 102 is improved by using the rigid seal material 215. It is possible to realize the thermal-type flowmeter 1 which has strong vibration resistance. In addition, with this embodiment, a cover component which is a lid for the housing 100 and the seal material 215 according to the related art can be eliminated. The thermal-type flowmeter 1 can be realized at a low cost.

In this embodiment, the description has been given about an exemplary electrical connection in which the electronic component 305 of the electrode pad and the connector terminal 105 are connected by the wire bonding 308. For example, in a mechanical and electrical contact connection such as press fitting or a method using paste, the connector terminal 105 and the substrate 101 may be directly connected. In the case of the above configuration, the electronic component 305 is eliminated, the number of man-hours can be reduced, and the thermal-type flowmeter 1 can be realized at a low cost.

Figure 4A:
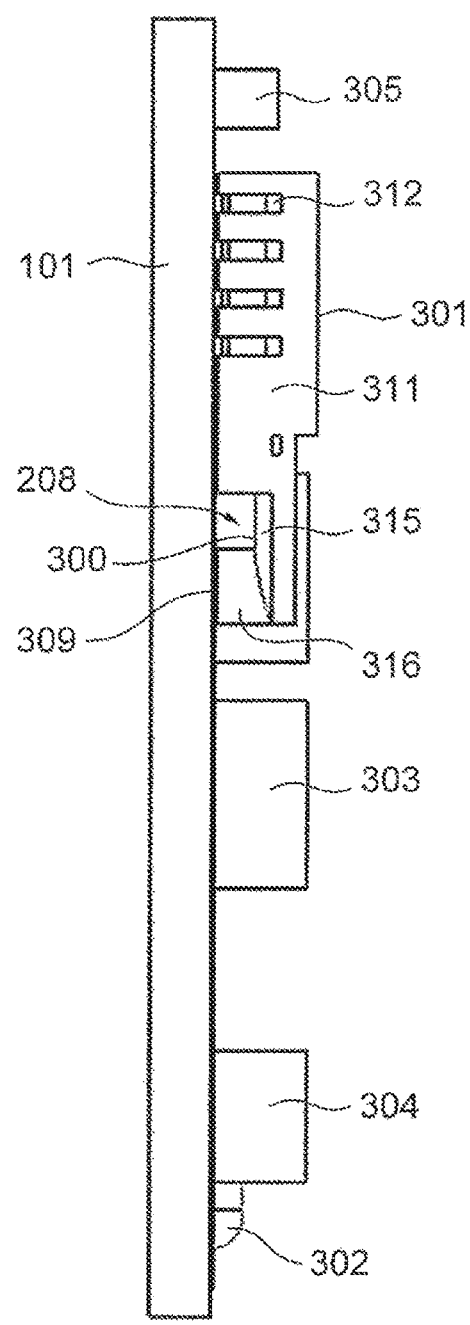
FIG. 4A is a left side view of a circuit package 301.
Figure 4B:
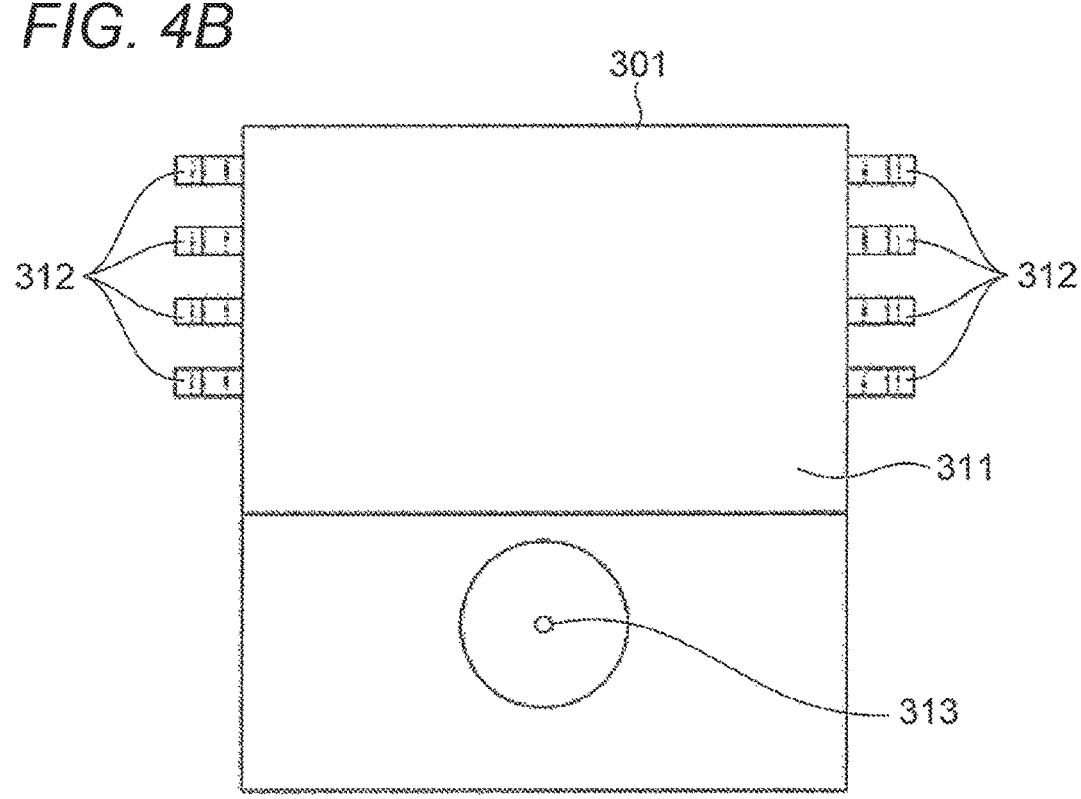
FIG. 4B is a front view of the circuit package 301.
Figure 4C:
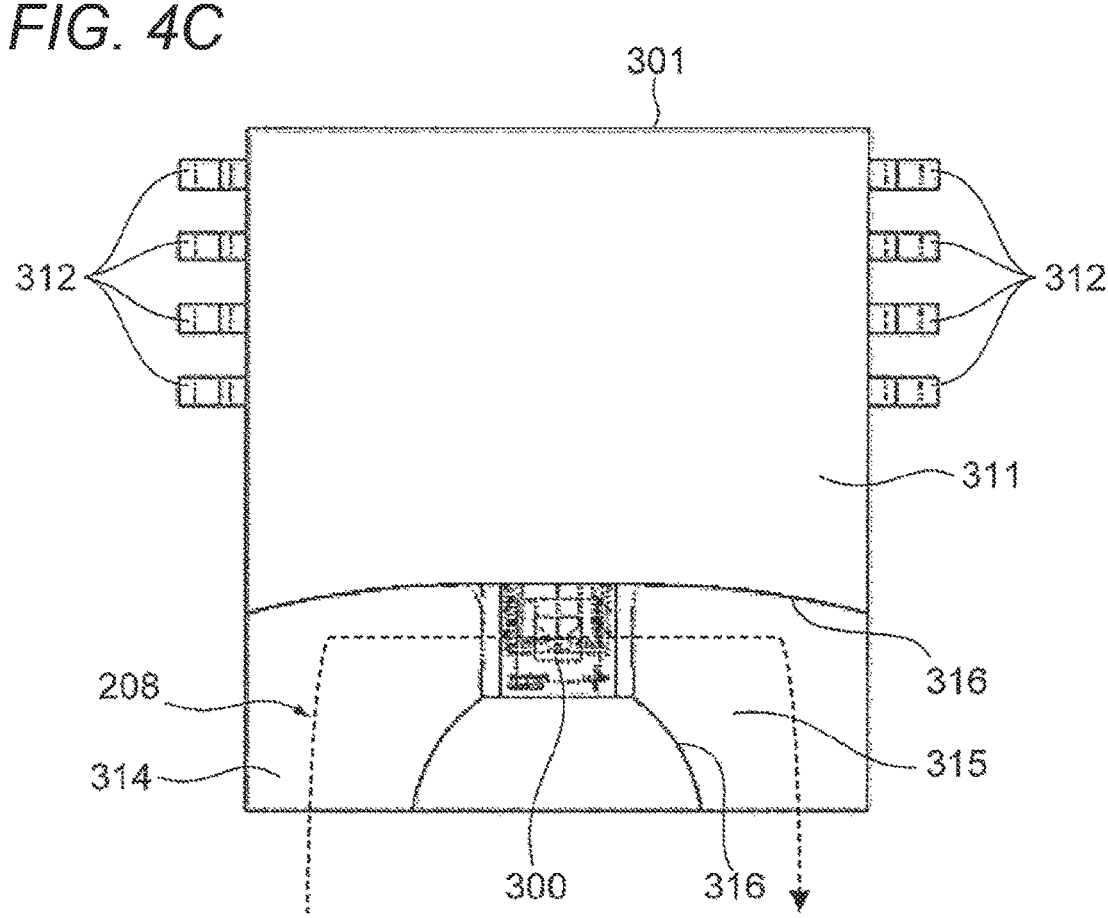
FIG. 4C is a rear view of the circuit package 301.
Figure 4D:
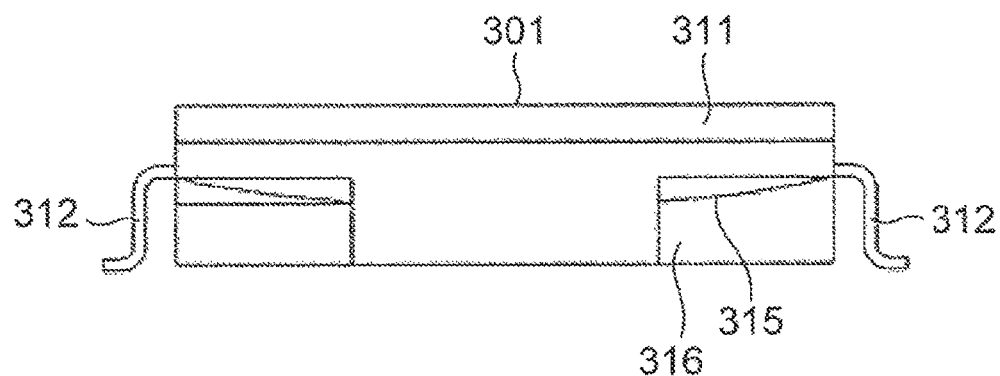
FIG. 4D is a bottom view of the circuit package 301.
Figure 4E:
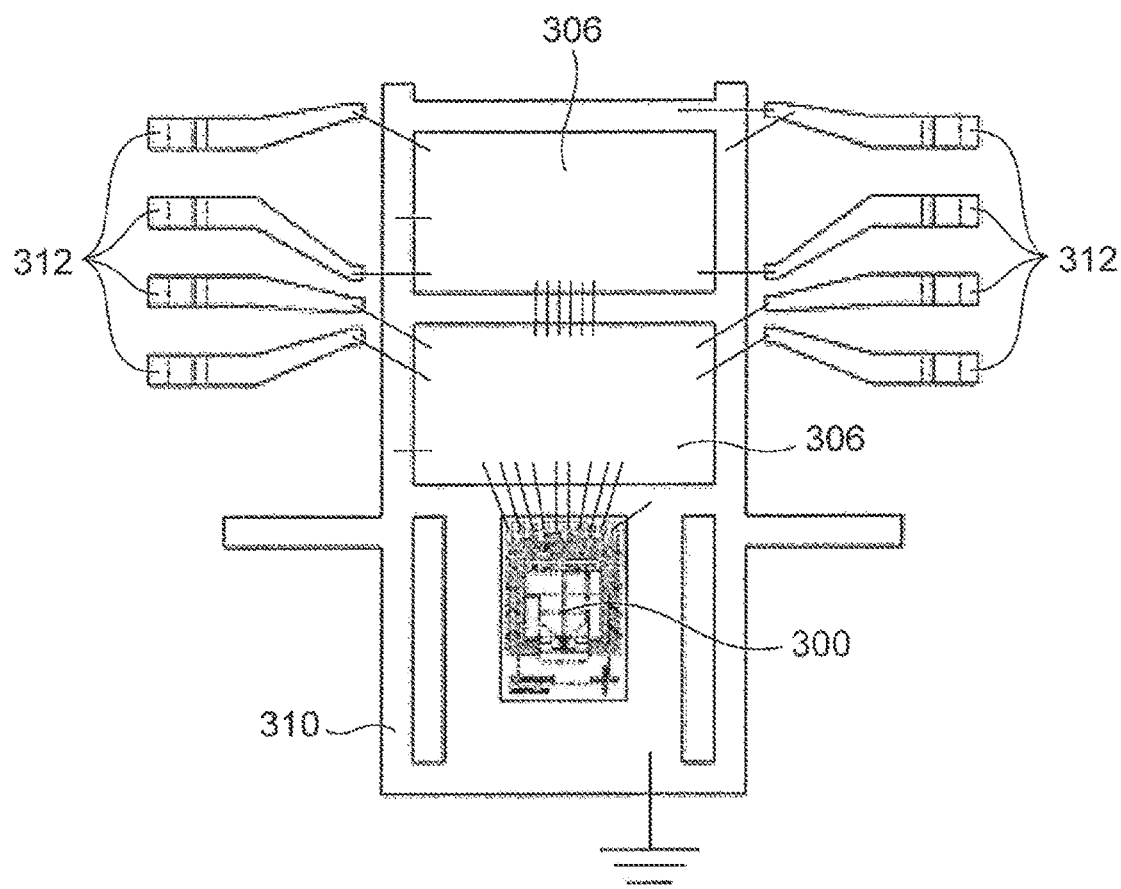
FIG. 4E is a rear view of the circuit package 301 in which a resin material 311 of FIG. 4C is removed.

FIG. 4A is a left side view of the circuit package 301. FIG. 4B is a front view of the circuit package 301. FIG. 4C is a rear view of the circuit package 301. FIG. 4D is a bottom view of the circuit package 301. FIG. 4E is a rear view of the circuit package 301 in which the resin material 311 of FIG. 4C is removed.

The substrate 101 formed on one surface side of the sub-passage 200 is configured such that part of a ground wire 309 is exposed along the shape of the sub-passage 200. In addition, the ground wire 309 is disposed such that at least part of the ground wire 309 faces the detection surface of the flow measurement unit 300 mounted in the circuit package 301, and forms an electrostatic scattering mechanism. For example, the ground wire 309 is formed in a pattern along the shape of the sub-passage 200. However, part of the ground wire may be covered with a resist film to protect the surface. In other words, the substrate 101 includes a GND wire (ground wire) at a position facing the detection surface where the flow rate detection element of the flow measurement unit 300 is exposed.

In the configuration as in this embodiment, a dirty substance (dust, carbon, etc.) entering the sub-passage 200 is attached to the ground wire 309, so that it is possible to reduce the degradation in the measurement performance of the flow measurement unit 300. In the thermal-type flowmeter 1 having such a configuration, it is possible to realize the thermal-type flowmeter 1 with a high reliability so that contamination resistance can be improved.

In a conventional system, the electrostatic scattering mechanism is configured by providing an additional component in a cover component of a lid, by changing to a conductive material, or an electrical connection place through an intermediate member. With this regard, in the configuration of this embodiment, the electrostatic scattering mechanism is configured by the housing 100, the substrate 101, and the circuit package 301 which are basic components of the thermal-type flowmeter 1. Therefore, it is possible to achieve a compact structure, a reduction of cost by reducing the number of components, and an improvement in mounting accuracy. In addition, the circuit package 301 can be electrically connected to the substrate 101 by soldering, so that there is no need to add a specific electrical connection element. Further, there is also no need to change a material to a conductive one, so that it is possible to realize the thermal-type flowmeter 1 with a high reliability.

The ground wire 309 is exposed to the measurement target gas 5 which flows in the sub-passage 200. Therefore, a coating such as plating is implemented for the protection from a dirty substance (corrosive gas, liquid, etc.) which is tolerant of permeability. In this embodiment, the ground wire 309 is plated for the protection. In the thermal-type flowmeter 1 configured as in this embodiment, it is possible to improve reliability on a dirty substance which is tolerant of permeability, and to realize the thermal-type flowmeter 1 having high durability and reliability.

In the circuit package 301, the circuit component 306 controlling a plurality of measurement units and the circuit component such as an electronic component (capacitor) to protect the circuit are mounted in a lead frame 310 which is made of a metal component as illustrated in FIG. 4E, and connected to the circuit component 306 and the electronic component, and to the lead frame 310 by the wire bonding. In addition, the lead frame 310 immediately below where the flow measurement unit 300 and the circuit component 306 are mounted is grounded, and directly earthed by the wire bonding. With this configuration, the flow measurement unit 300 and the circuit component 306 are configured narrow in the thickness direction (Z-axis direction) of the casing body 102 by the ground of the lead frame 310 and the ground wire 309 of the substrate 101. Therefore, it is possible to realize the thermal-type flowmeter 1 with a high reliability so as to improve a reliable radio wave relation such as EMC.

In addition, the circuit package 301 is configured to be sealed by the resin material 311 in a state where at least part of the circuit package is exposed. With this configuration of the resin-molded circuit package 301, it is possible to improve reliability on a dirty substance which is tolerant of permeability, and to realize the thermal-type flowmeter 1 having high durability and reliability.

The circuit package 301 molded by a die is made with a high accuracy in dimension, and a variation of the sub-passage 208 can be reduced. Therefore, it is possible to realize the thermal-type flowmeter 1 with a high accuracy.

The circuit package 301 forms a supporting body which supports the flow rate detection element. The circuit package 301 is configured as a resin package in which part of the flow rate detection element, the lead frame 310 where the flow rate detection element is mounted, some of the input/output terminals, the circuit component are integrally sealed by the resin material 311. The recessed groove 314 of the circuit package 301 is formed by the resin material 311.

The lead frame 310 includes an outer lead 312. The outer lead 312 protruding from the tip of the circuit package 301 is partially bent in a bellows shape, and connected and fixed to the substrate 101 with solder so as to form a connection portion on the surface side of the flow measurement unit 300. A plurality of the outer leads 312 serve as input/output terminals to transfer input/output signals with respect to the circuit component 306, and also serve as fixing portion to fix the circuit package 301 and the substrate 101. In addition, the substrate 101 and the resin material 311 contain a glass-based filler, so that linear expansion coefficients of the materials are close to each other.

Therefore, in a case where the substrate 101 is deformed due to an environmental change, the stress can be alleviated by the outer lead 312 which includes the bent portion, and the reliability of the connection portion can be improved. In addition, the circuit package 301 and the substrate 101 have a similar deformation tendency, so that the stress load on the connection portion can be reduced, and a dimension shape of the sub-passage 208 can be stabilized. With the configuration as in this embodiment, it is possible to realize the thermal-type flowmeter 1 with a high reliability.

The flow measurement unit 300 includes a diaphragm shape in which a hollow portion is provided in the rear surface of the flow rate detection element. The lead frame 310 is provided with a ventilation hole 313 passing through at a position corresponding to the flow measurement unit 300, and is configured to be connected to the hollow portion of the rear surface of the flow rate detection element. The flow measurement unit 300 is reduced in pressure difference between the front surface (the detection surface of the flow rate detection element) and the rear surface of the diaphragm. Therefore, the distortion of the diaphragm can be suppressed, and it is possible to realize the thermal-type flowmeter 1 with a high accuracy in the flow rate measurement.

In the circuit package 301, the recessed groove 314 is formed to form the sub-passage 208. In the bottom surface of the recessed groove 314, the flow measurement unit 300 is exposed from the resin material 311. The recessed groove 314 is recessively provided in the surface facing the substrate 101 of the circuit package 301, and forms the sub-passage 208 in cooperation with the substrate 101. The recessed groove 314 is disposed at a position on the way to the first groove 205. The recessed groove 314 forms a guide portion in which the cross-sectional area of the flow passage of the sub-passage 208 is set to smaller than the cross-sectional area of the flow passage of the other sub-passage connected on both sides of the sub-passage 208. In other words, the recessed groove 314 of the circuit package 301 becomes a guide portion in which the sub-passage 208 (passage portion) formed in cooperation with the substrate 101 in the sub-passage 200 is set to be a flow passage with a cross-sectional area smaller than the other passage portion connected to both ends of the sub-passage 208.

In the circuit package 301, the first groove 205 is disposed in a U-turn portion as illustrated in FIG. 3B. In the recessed groove 314, the shape of a pair of slopes 316 is formed to be continuously matched to the shape of the first groove 205. Specifically, as illustrated in FIG. 4C, the pair of slopes 316 are separated while interposing the flow measurement unit 300 in an asymmetrical shape.

As illustrated in FIG. 4D, the recessed groove 314 includes a slope 315 which is inclined in a direction approaching the substrate 101 such that the cross-sectional area of the flow passage of the sub-passage 208 is gradually narrowed as it goes from the tip of the circuit package 301 toward a direction approaching the flow measurement unit 300. The slope 315 is provided to be inclined from the front surface to the rear surface of the circuit package 301.

In addition, as illustrated in FIG. 4C, the recessed groove 314 includes the slope 316 which is three-dimensionally narrowed such that the cross-sectional area of the flow passage of the sub-passage 208 is gradually narrowed as it goes from the tip of the circuit package 301 toward a direction approaching the flow measurement unit 300. The slope 316 is inclined in a direction in which the width of the recessed groove 314 is gradually narrowed as it goes in a direction approaching the flow measurement unit 300.

The recessed groove 314 is formed such that the cross-sectional area thereof is reduced by the slope 315 and the slope 316 as it goes in a direction approaching the flow measurement unit 300 from the tip of the circuit package 301. Therefore, the flow rate of the measurement target gas is reduced when the gas passes through the sub-passage 208. In addition, the outer periphery of the circuit package 301, the recessed groove 314, the slope 315, and the slope 316 are molded by a die, and thus a cut taper and an R shape are formed in consideration of peeling. With this configuration, it is possible to form the recessed groove 314 in a three-dimensional smooth shape.

In the configuration of this embodiment, it is possible to form the sub-passage 208 of a smooth shape along the flow of the measurement target gas 5 flowing in the sub-passage 200. A stable flow can be guided to the flow measurement unit 300. In addition, the circuit package 301 molded by a die is made with a high accuracy in dimension, and a variation of the sub-passage 208 can be reduced. Therefore, it is possible to realize the thermal-type flowmeter 1 with a high accuracy.

Second Embodiment

Figure 5A:
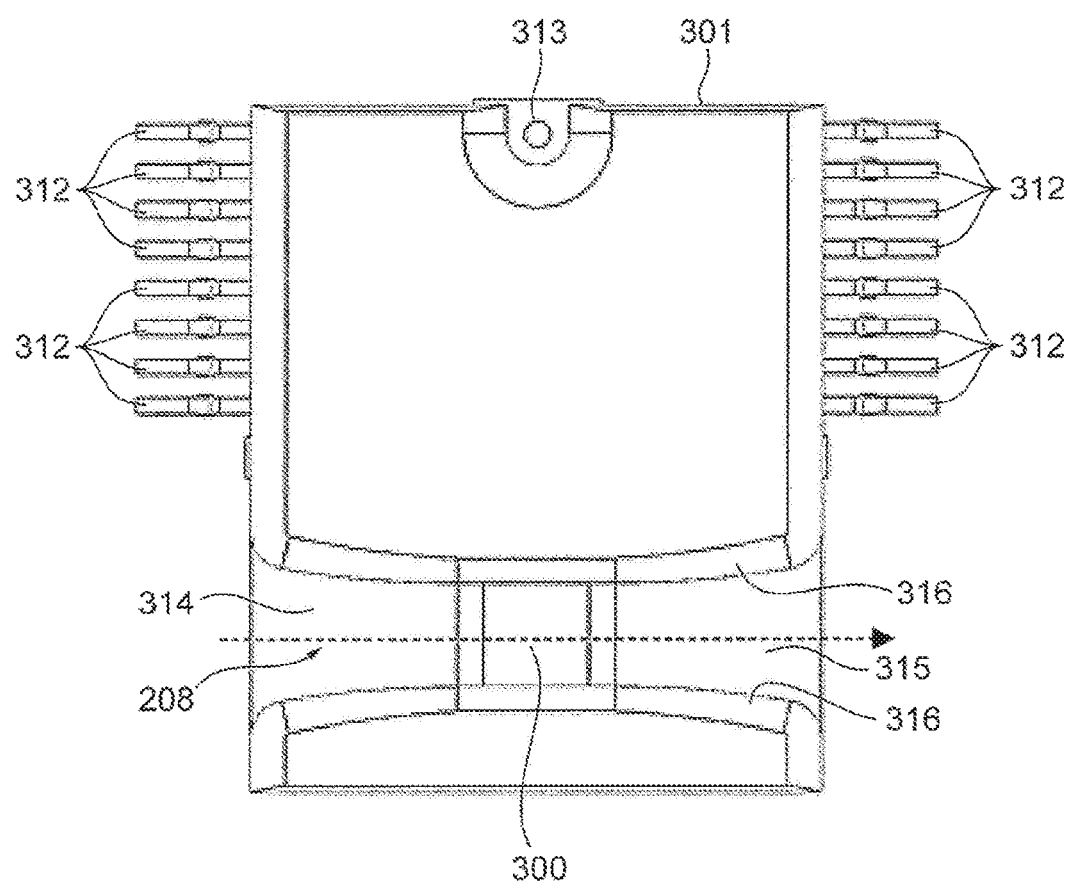
FIG. 5A is a rear view of the circuit package 301 of the thermal-type flowmeter 1 according to a second embodiment.
Figure 5B:
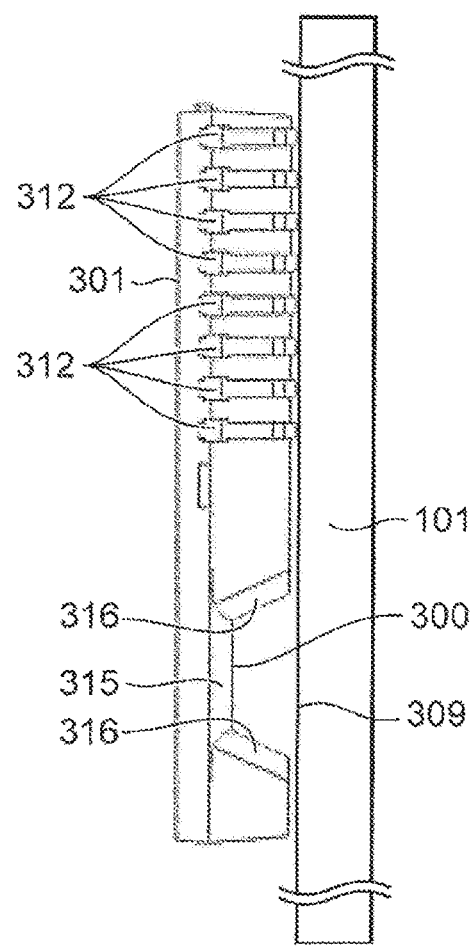
FIG. 5B is a left side view of the circuit package 301 according to FIG. 5A.
Figure 5C:
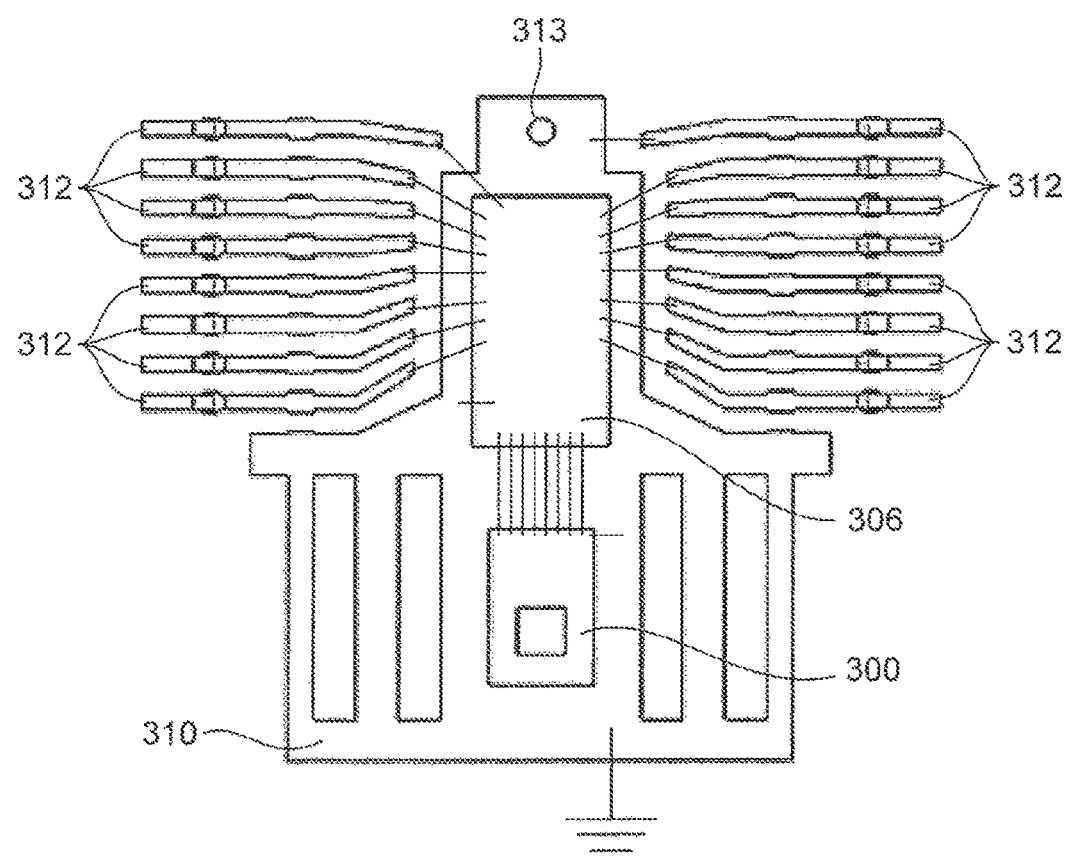
FIG. 5C is a rear view in which the resin material 311 of the circuit package 301 according to FIG. 5A is removed.
Figure 5D:
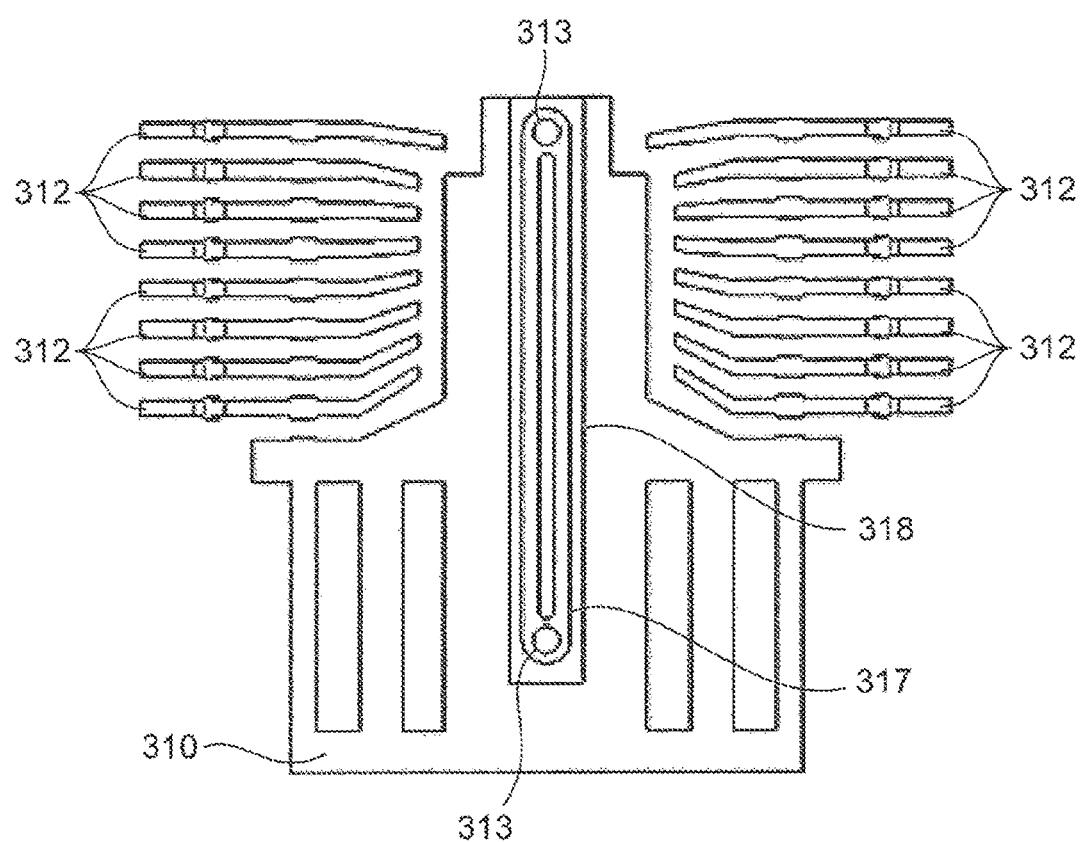
FIG. 5D is a front view of a lead frame 310 according to FIG. 5A.
Figure 5E:
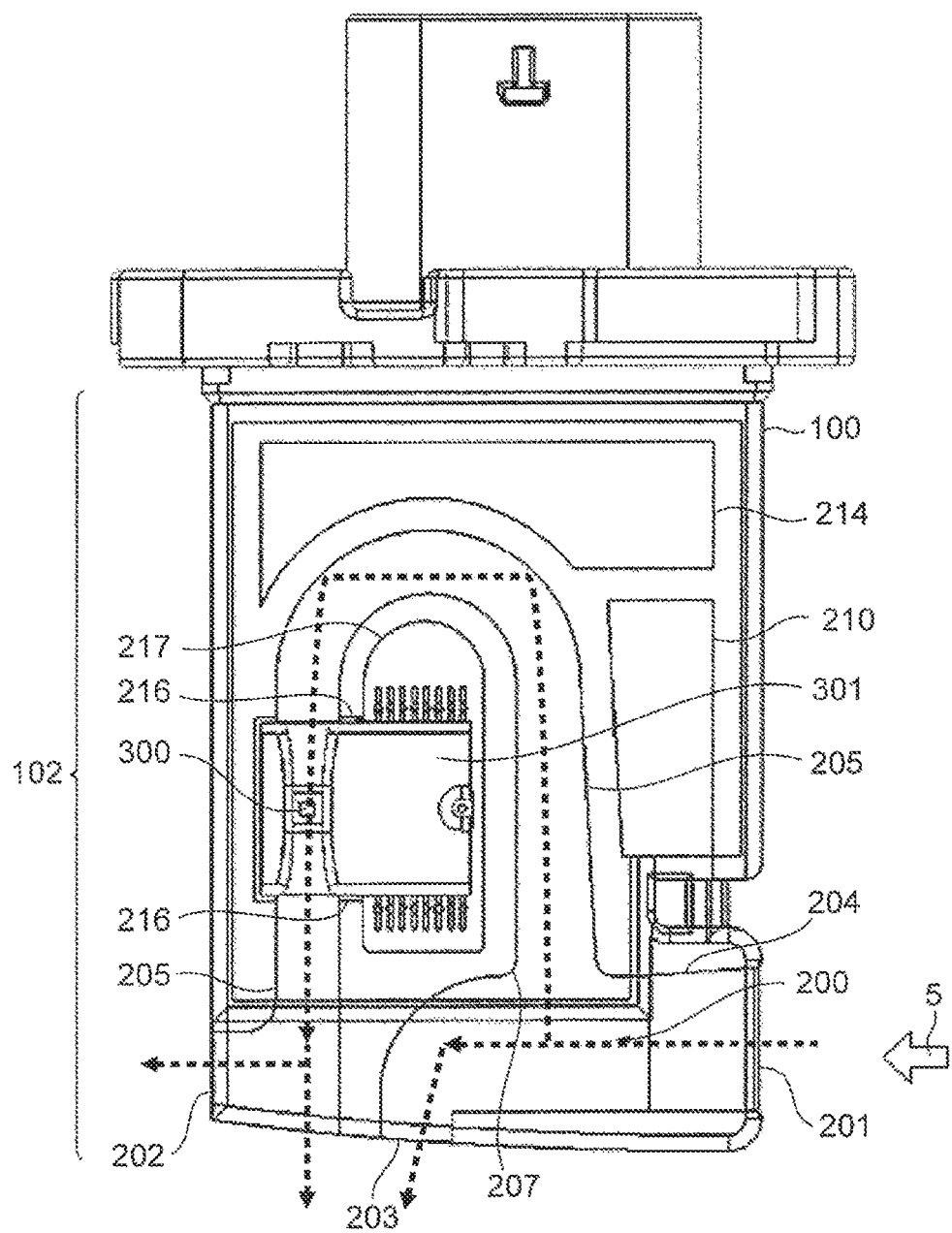
FIG. 5E is a front view in which the circuit package 301 according to FIG. 5A is mounted in a casing body 102.

FIG. 5A is a rear view of the circuit package 301 of the thermal-type flowmeter 1 according to a second embodiment. FIG. 5B is a left side view of the circuit package 301 according to FIG. 5A. FIG. 5C is a rear view in which the resin material 311 of the circuit package 301 according to FIG. 5A is removed. FIG. 5D is a front view of the lead frame 310 according to FIG. 5A. FIG. 5E is a front view in which the circuit package 301 according to FIG. 5A is mounted in the casing body 102.

In the example illustrated in FIG. 4C, the pair of slopes 316 disposed in the recessed groove 314 of the circuit package 301 have an asymmetric shape with the flow measurement unit 300 interposed therebetween. In the example illustrated in FIG. 5A, the shape is symmetric with the flow measurement unit 300 interposed therebetween. For example, in a case where the circuit package 301 is provided in the sub-passage 200 formed by the first groove 205 as illustrated in FIG. 5E, it is possible to introduce a stable flow linearly along the shape of the first groove 205 to the flow measurement unit 300. Therefore, it is possible to realize the thermal-type flowmeter 1 with a high accuracy in the flow rate measurement. In addition, in a case where there is generated a pulsation flow having a flow component reversed to the flow of the measurement target gas 5 flowing in the sub-passage 200, the gas can be introduced to the flow measurement unit 300 in an accurate flow direction by the symmetric structure. It is possible to realize the thermal-type flowmeter 1 with a high accuracy in the flow rate measurement having a less pulsation error.

The number of the outer leads 312 is increased in consideration of a digital correspondence to the input/output of various types of physical quantity sensors. With this configuration, required specifications of various types of physical quantity sensors can be handled by one specification, so that it is possible to realize a variety of thermal-type flowmeters 1 using a common circuit package 301.

The ventilation hole 313 is configured to be connected to the hollow portion in the rear surface of the flow measurement unit 300 through a ventilation groove 317 which is earthed to the lead frame 310. In addition, the ventilation groove 317 is sealed by an adhesive film 318, and molded by the resin material 311 to fix the connection hole.

The ventilation hole 313 is provided in a recessed groove 217 which is partitioned separately from the first groove 205 flowing in the sub-passage 200, and connected through a slit 216 which is a pressure introduction hole of the measurement target gas 5. The recessed groove 217 is exposed to the measurement target gas 5 flowing in the main passage 7 through the sub-passage 200. Therefore, the recessed groove may be configured to protect the outer lead 312 using gel for the protection from a dirty substance (corrosive gas, liquid, etc.) which is tolerant of permeability, and a seal material such as an adhesive.

In the configuration as in this embodiment, in a case where a dirty substance (dust and water drops) permeates the measurement target gas 5 flowing in the sub-passage 200, the permeability can be reduced by a direct attaching to the ventilation hole 313. With this configuration, it is possible to realize the thermal-type flowmeter 1 which is improved in a measurement accuracy of the flow rate and the contamination resistance.

Third Embodiment

Figure 6:
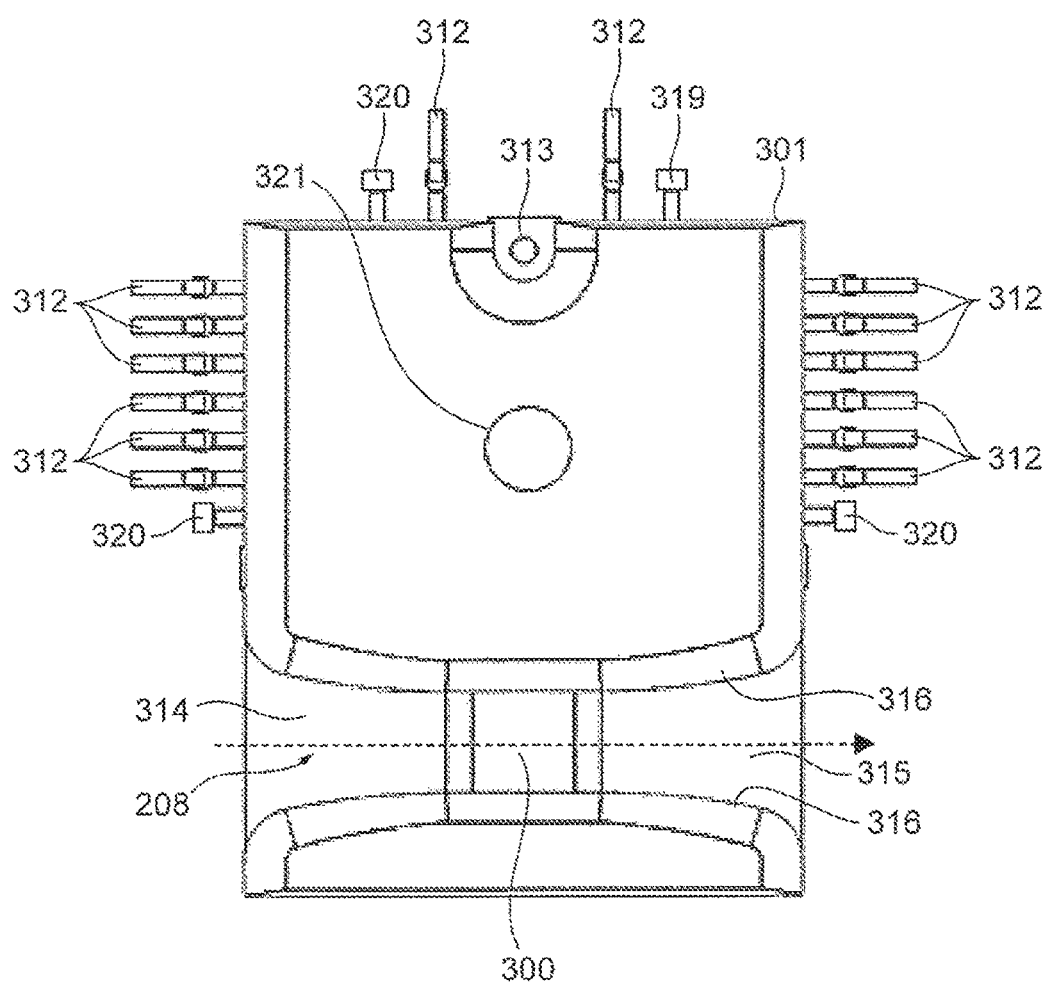
FIG. 6 is a rear view of the circuit package 301 of the thermal-type flowmeter 1 according to a third embodiment.
Figure 8A:
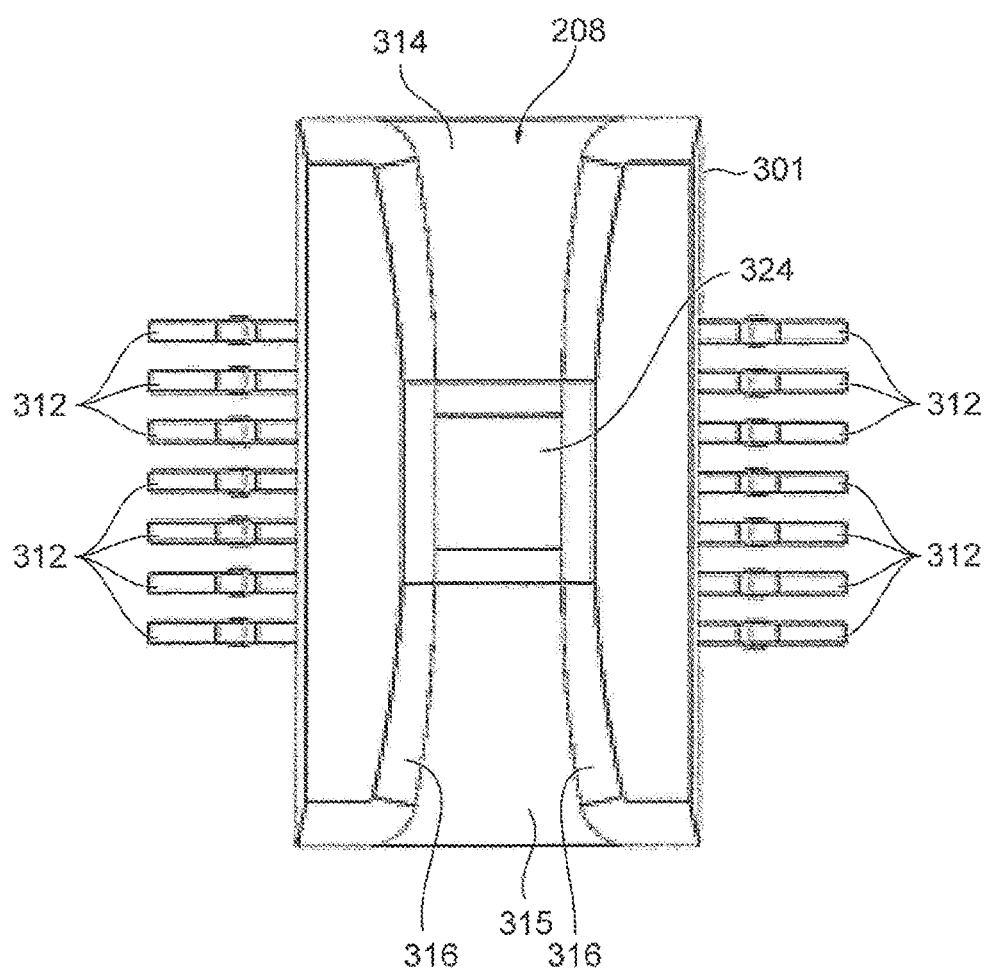
FIG. 8A is a rear view of the circuit package 301 in a case where the flow measurement unit 300 and a circuit component 306 are integrated.
Figure 8B:
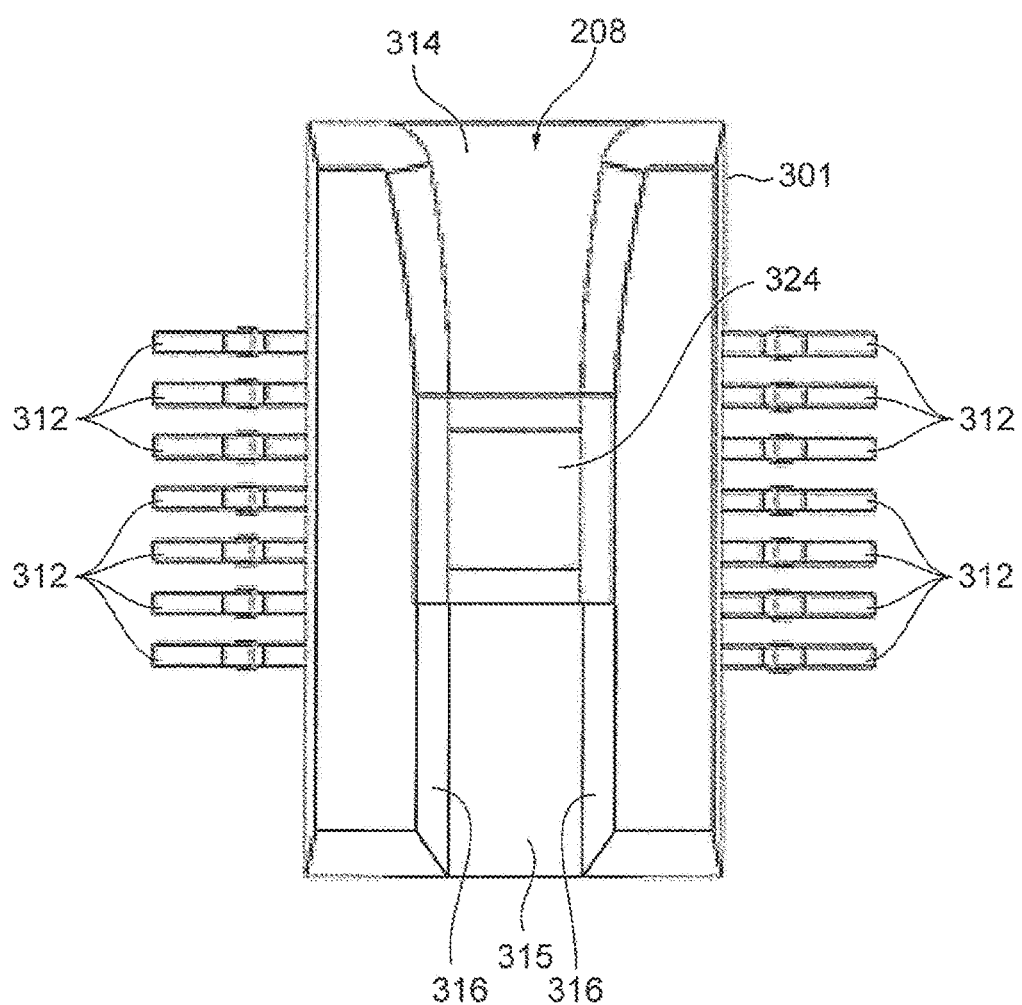
FIG. 8B is a rear view in which a recessed groove 314 of the circuit package 301 according to FIG. 8A is changed.
Figure 8C:
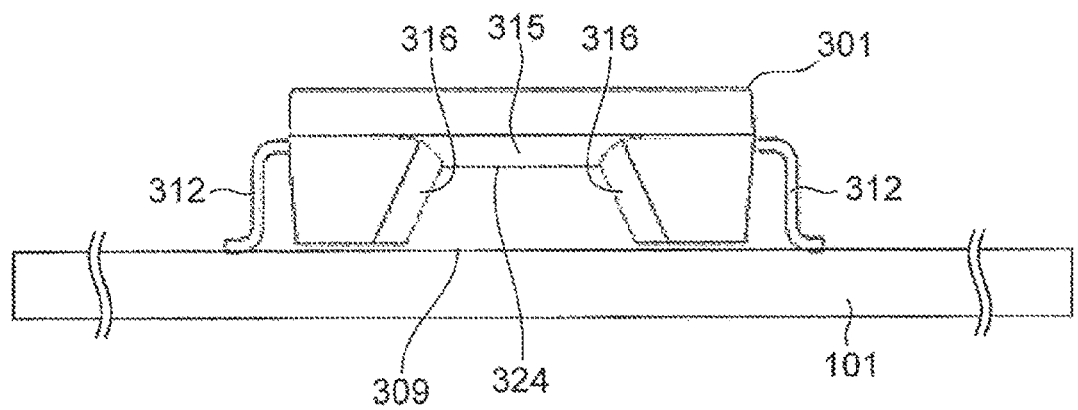
FIG. 8C is a bottom view of the circuit package 301 according to FIG. 8A.
Figure 8D:
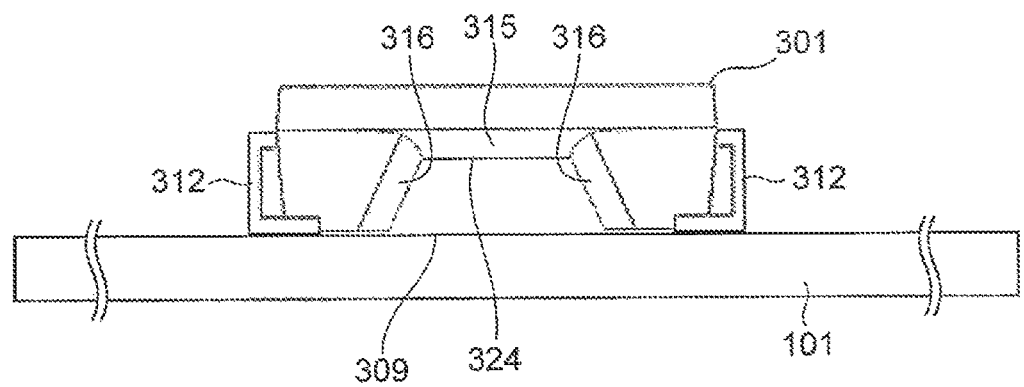
FIG. 8D is a bottom view in which an outer lead 312 according to FIG. 8C is changed.

FIG. 6 is a rear view of the circuit package 301 of the thermal-type flowmeter 1 according to a third embodiment. FIG. is a rear view in which an exposed state of a flow measurement unit 300 of FIG. 6 is changed. FIG. 8A is a rear view of the circuit package 301 in a case where the flow measurement unit 300 and the circuit component 306 are integrated. FIG. 8B is a rear view in which the shape of the recessed groove 314 of the circuit package 301 according to FIG. 8A is changed. FIG. 8C is a bottom view of the circuit package 301 according to FIG. 8A. FIG. 8D is a bottom view in which the outer lead 312 according to FIG. 8C is changed.

FIG. 6 illustrates an example in which the outer lead 312 of the circuit package 301 illustrated in FIG. 5A is added. The outer lead 312 is used as an input/output unit with respect to a plurality of devices such as the circuit component 306, the flow measurement unit 300, the temperature measurement unit 302, the pressure measurement unit 303, and the humidity measurement unit 304. In the outer lead 312, there are provided an adjustment pin 319 used to adjust the components and the unnecessary dummy pin 320 which are unrelated to the input/output of the thermal-type flowmeter 1, or a terminal which is not used to transfer signals at a normal usage. The outer lead is once bent on a detection surface side of the flow measurement unit 300, and configured in a straight shape.

At least one terminal which is not used in transferring signals in a normal operation between the dummy pin 320 and the adjustment pin 319 is used as a positioning portion to determine a position of the circuit package 301 with respect to the substrate 101. The adjustment pin 319 and the unnecessary dummy pin 320 are pressed fit into and fixed when being bonded to the substrate 101. Therefore, the adjustment pin 319 and the unnecessary dummy pin 320 serve to temporarily fix to determine the position of the circuit package 301 to the substrate 101. For example, the tip ends of the adjustment pin 319 and the unnecessary dummy pin 320 may be formed in a holding shape for the purpose of press-fitting. In addition, a concavo-convex portion 321 may be formed to determine the position of the circuit package 301 to improve the accuracy of positioning.

In the configuration as in this embodiment, the circuit package 301 can be provided in the substrate 101 with a high accuracy in dimension. It is possible to realize the thermal-type flowmeter 1 with a high accuracy by improving the accuracy in dimension of the sub-passage 208.

In the first embodiment described above, the description has been given about an example in which the circuit package 301 (supporting body) is configured such that part of the flow rate detection element is integrally sealed by the resin material 311, but the present invention is not limited to this configuration. For example, the present invention may be similarly applied to a configuration that the flow rate detection element is not integrally sealed to the circuit package but individually attached. For example, the present invention may be applied to a configuration that the supporting body has a resin package configuration in which the circuit component, the lead frame where the circuit component is mounted, and some of the input/output terminals are integrally sealed by the resin material, and the flow rate detection element is individually provided on the resin package.

Figure 7:
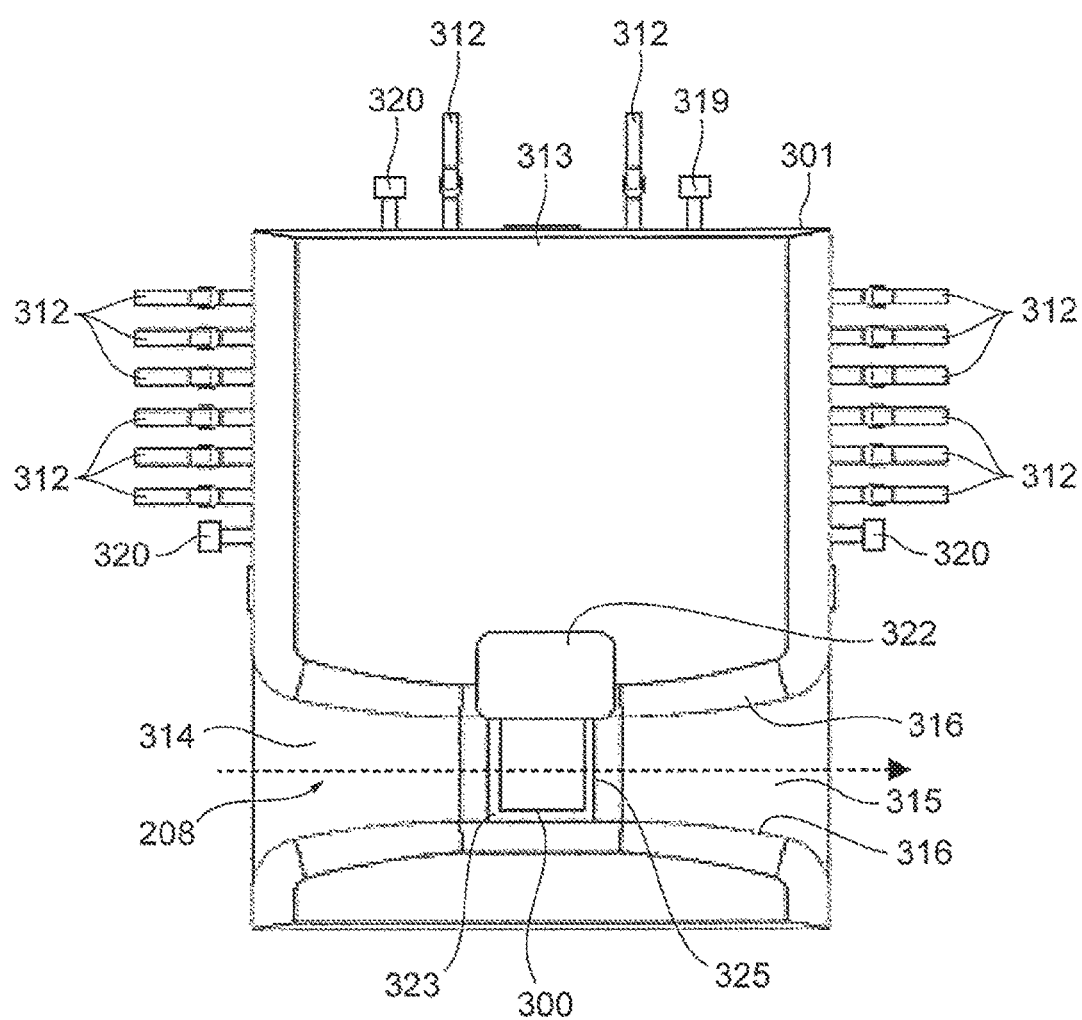
FIG. 7 is a rear view in which an exposed state of a flow measurement unit 300 of FIG. 6 is changed.

FIG. 7 illustrates an example in which the flow measurement unit 300 of FIG. 6 is not integrally molded but exposed. The circuit package 301 is configured such that the circuit component 306 to control a plurality of measurement units and the circuit component such as the electronic component 305 (capacitor) to protect the circuit are mounted in the lead frame 310, and a recessed groove 325 to store the flow measurement unit 300 is formed and sealed by the resin material 311. In the recessed groove 325 of the circuit package 301 molded with resin, the flow measurement unit 300 is provided, and connected from the lead frame 310 to the circuit component 306 by the wire bonding. Further, a seal material 322 is used for protection from a dirty substance (corrosive gas, liquid, etc.) which is tolerant of permeability in order to protect the wire bonding. In addition, a gap is provided at the time of mounting the recessed groove 325 and the flow measurement unit 300, so that a U-like ventilation slit 323 having a high aspect ratio can be configured.

In the configuration as in this embodiment, in a case where a dirty substance (dust, water drops) permeates the measurement target gas 5 flowing in the sub-passage 200, it is possible to alleviate a concern of complete closing by the U-shape ventilation slit 323 having a high aspect ratio. With this configuration, it is possible to realize the thermal-type flowmeter 1 which is improved in a measurement accuracy of the flow rate and the contamination resistance.

In addition, for example, the present invention may be applied to a configuration that the flow rate detection element and the circuit component are integrated as one chip. For example, the present invention may be applied to a configuration that the flow rate detection element is integrally formed with the circuit component, the supporting body is a resin package in which part of the flow rate detection element, the lead frame where the flow rate detection element is mounted, and some of the input/output terminals are integrally sealed by the resin material, and the detection surface of the flow rate detection element is exposed from the surface of the resin package.

FIG. 8A illustrates an example of the circuit package 301 of one chip configured by integrating the flow measurement unit 300 and the circuit component 306 of FIG. 6. The circuit package 301 is configured such that a flow rate measurement chip 324 in which the flow measurement unit 300 and the circuit component 306 are integrated, and the circuit component such as the electronic component 305 (capacitor) to protect the circuit are mounted in the lead frame 310. In addition, the circuit package 301 is configured to be sealed by the resin material 311 in a state where at least part of the circuit package is exposed. With this configuration, the circuit package 301 can be made compact, and the electronic component 305 to be mounted in the substrate 101 can be made to satisfy the conventional size.

In the configuration as in this embodiment, it is possible to reduce the number of processes by making the circuit package 301 compact, and the number of man-hours by commodifying the mounting. Further, it is possible to improve handling performance, and to realize the thermal-type flowmeter 1 with a low cost. In addition, the housing 100 and the casing body 102 can be configured small by making the circuit package 301 compact. It is possible to realize the thermal-type flowmeter 1 of a low pressure loss without hindering the flow of gas in the main passage 7.

FIG. 8B illustrates an example in which the shape of the recessed groove 314 of the circuit package 301 is changed. In the circuit package 301, the flow measurement unit 300 is exposed from the resin material 311, and the recessed groove 314 is formed to form the sub-passage 208. The shape of the recessed groove 314 is configured such that the slope 315 and the slope 316 are arranged bi-symmetrically with respect to the axial direction of the flow of the measurement target gas flowing in the sub-passage 208 about the flow measurement unit 300. The slope 315 and the slope 316 are arranged such that the one side in the axial direction and the other side of the recessed groove 314 are asymmetrically with the flow measurement unit 300 interposed therebetween. In a case where a pulsation flow containing a reverse component of the flow of the measurement target gas 5 flowing in the sub-passage 200 is generated, the amount of forward and backward air to be taken into can be adjusted with the bi-symmetric structure. With this configuration, it is possible to adjust an error tendency generated by the pulsation flow according to the changing flow of the main passage 7.

In the configuration as in this embodiment, it is possible to realize the thermal-type flowmeter 1 with a high accuracy in flow rate measurement by adjusting the error tendency generated at the time of pulsation.

FIG. 8C illustrates a bottom view of FIG. 8A, and illustrates an example in which the outer lead 312 of FIG. 8A is changed. The outer lead 312 protruding from the tip of the circuit package 301 is partially bent in a bellows shape, and connected to the substrate 101 so as to form a connection portion on the surface side of the flow measurement unit 300. In the embodiment of FIG. 8D, the outer lead 312 is bent in a U shape so as to be made further compact more than the circuit package 301 illustrated in FIG. 8C. In addition, a bending shape of the outer lead 312 and a connection shape of the tip end may be a smooth R shape.

In the configuration as in this embodiment, the housing 100 and the casing body 102 can be configured small by making the circuit package 301 compact still more. It is possible to realize the thermal-type flowmeter 1 of a low pressure loss without hindering the flow of gas in the main passage 7.

Figure 9:
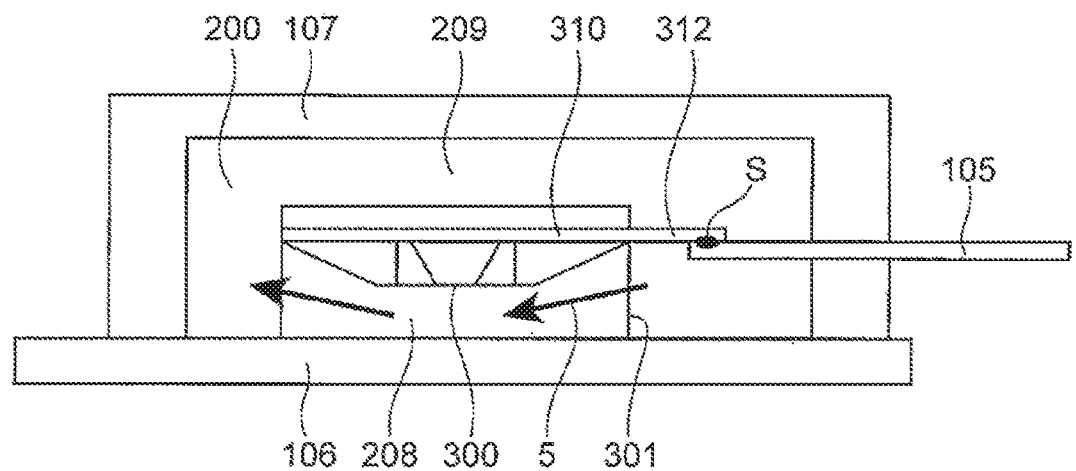
FIG. 9 is a cross-sectional view for conceptually describing another example of the configuration of the thermal-type flowmeter in this embodiment.

FIG. 9 is a cross-sectional view for conceptually describing another example of the configuration of the thermal-type flowmeter in this embodiment.

The thermal-type flowmeter of this embodiment includes a base 106 made of a conductive material (aluminum alloy), a housing cover 107 which forms the sub-passage 200 between the base 106 and the cover 107, and a supporting body 301 which is attached to the base 106 to support the flow measurement unit 300 in the sub-passage 200. Then, the flow measurement unit 300 is configured such that the detection surface of the flow rate detection element is disposed to face the base 106. In addition, the outer lead 312 of the lead frame 310 protruding from the supporting body 301 is directly bonded to the connector terminal 105 by welding at a welding point S.

In the embodiments, the description has been given about the configuration that the lead frame is connected to the ground wire of the substrate 101 by solder. However, in this embodiment, as illustrated in FIG. 9, the lead frame is welded to the terminal to be directed bonded, so that it is possible to increase connection strength. Then, the wire bonding may be omitted, and the number of components can be reduced and the manufacturing work may be simplified.

In addition, in the embodiments described above, the description has been given about a configuration that the substrate 101 equipped with the ground wire 309 is disposed at a position facing the detection surface of the flow rate detection element. However, in this embodiment, the base 106 made of a conductive material is disposed. With such a configuration, there is no need to plate the ground wire, so that the manufacturing work may be simplified.

Hitherto, the embodiments of the present invention have been described in detail, but the present invention is not limited to the embodiments. Various modifications may be made within a scope not departing from the spirit of the present invention disclosed in claims. For example, the above-described embodiments have been described in detail for describing the present invention in a clearly understandable way, and are not necessarily limited to those having all the described configurations. In addition, some of the configurations of a certain embodiment may be replaced with the configurations of the other embodiments, and the configurations of the other embodiments may be added to the configurations of the subject embodiment. In addition, some of the configurations of each embodiment may be omitted, replaced with other configurations, and added to other configurations.

REFERENCE SIGNS LIST 1 thermal-type flowmeter
5 measurement target gas (fluid)
7 main passage
100 housing
101 substrate
102 casing body
103 flange
200 sub-passage
201 entrance
202 exit
203 exhaust port
207 branch groove
208 sub-passage
209 sub-passage
215 seal material
300 flow measurement unit
301 circuit package
302 temperature measurement unit
303 pressure measurement unit
304 humidity measurement unit
305 electronic component
306 circuit component
307 adhesive
309 ground wire
310 lead frame
311 resin material
312 outer lead
313 ventilation hole
314 recessed groove (guide portion)
315 slope
316 slope

The invention claimed is:

1. A thermal-type flowmeter which is attached to a main passage, the thermal-type flowmeter comprising:
a sub-passage into which part of a measurement target gas flowing in the main passage is taken;
a flow rate detection element which is disposed in the sub-passage;
a supporting body which supports the flow rate detection element; and
a circuit substrate to which the supporting body is fixed,
wherein the flow rate detection element includes only in one surface thereof a detection surface to detect a flow rate of the measurement target gas, and is disposed such that the detection surface faces the circuit substrate.

2. The thermal-type flowmeter according to claim 1,
wherein, in the circuit substrate, a GND wire is disposed at a position to face the detection surface of the flow rate detection element.

3. The thermal-type flowmeter according to claim 1,
wherein the supporting body includes a guide portion in which a passage portion formed in cooperation with the circuit substrate in the sub-passage is set to be a flow passage with a cross-sectional area smaller than another passage portion connected to both ends of the passage portion.

4. The thermal-type flowmeter according to claim 3,
wherein the supporting body includes a resin package in which part of the flow rate detection element, a lead frame where the flow rate detection element is mounted, some of input/output terminals, and a circuit component are integrally sealed by a resin material,
wherein the detection surface of the flow rate detection element is exposed from a surface of the resin package,
wherein the guide portion is formed of the resin material, and
wherein the input/output terminal forms a fixing portion which fixes the supporting body to the circuit substrate.

5. The thermal-type flowmeter according to claim 3,
wherein the supporting body includes a resin package in which a circuit component, a lead frame where the circuit component is mounted, and some of input/output terminals are integrally sealed by the resin material,
wherein the guide portion is formed of the resin material, and
wherein the input/output terminal forms a fixing portion which fixes the supporting body to the circuit substrate.

6. The thermal-type flowmeter according to claim 3,
wherein the flow rate detection element is integrally formed with a circuit component,
wherein the supporting body includes a resin package in which part of the flow rate detection element, a lead frame where the flow rate detection element is mounted, and some of input/output terminals are integrally sealed by the resin material,
wherein the detection surface of the flow rate detection element is exposed from a surface of the resin package,
wherein the guide portion is formed of the resin material, and
wherein the input/output terminal forms a fixing portion which fixes the supporting body to the circuit substrate.

7. The thermal-type flowmeter according to claim 1, further comprising:
a conductive lead frame in which the flow rate detection element is mounted,
wherein the lead frame forms a fixing portion which fixes the supporting body to the circuit substrate.

8. The thermal-type flowmeter according to claim 1,
wherein the supporting body includes a positioning portion which determines a position with respect to the circuit substrate.

9. The thermal-type flowmeter according to claim 8,
wherein the positioning portion is configured by at least one of a dummy pin, an adjustment pin, and a terminal which is not used for transferring a signal at a normal usage.

10. The thermal-type flowmeter according to claim 4,
wherein the resin package includes a plurality of connection terminals, and
wherein the plurality of connection terminals are connected and fixed to the circuit substrate by solder.

11. The thermal-type flowmeter according to claim 2,
wherein the GND wire is plated for protection.

12. The thermal-type flowmeter according to claim 4,
wherein the guide portion includes a slope which is inclined in a direction approaching the circuit substrate such that a cross-sectional area of the flow passage is gradually narrowed as the flow passage goes moves from an end of the resin package toward the detection surface of the flow rate detection element.

13. The thermal-type flowmeter according to claim 4,
wherein the guide portion is three-dimensionally narrowed such that a cross-sectional area of the flow passage is gradually narrowed as the flow passage goes moves from an end of the resin package toward the detection surface of the flow rate detection element.

14. The thermal-type flowmeter according to claim 3, wherein the guide portion is formed in a symmetric or asymmetric shape with the detection surface interposed therebetween.

15. The thermal-type flowmeter according to claim 1, wherein, in the circuit substrate, at least one physical sensor other than the flow rate detection element and a circuit component are disposed.

* * * * *